(12) United States Patent
McGowan

(10) Patent No.: US 6,931,053 B2
(45) Date of Patent: Aug. 16, 2005

(54) PEAK POWER AND ENVELOPE MAGNITUDE REGULATORS AND CDMA TRANSMITTERS FEATURING SUCH REGULATORS

(75) Inventor: Neil N. McGowan, Stittsville (CA)

(73) Assignee: Nortel Networks Limited, St. Laurent (CA)

(*) Notice: Subject to any disclaimer, the term of this patent is extended or adjusted under 35 U.S.C. 154(b) by 910 days.

(21) Appl. No.: 09/729,097

(22) Filed: Dec. 5, 2000

(65) Prior Publication Data

US 2001/0000456 A1 Apr. 26, 2001

Related U.S. Application Data

(63) Continuation-in-part of application No. 09/200,759, filed on Nov. 27, 1998.

(51) Int. Cl.[7] ........................... H04B 1/69; H04B 1/707; H04B 1/713
(52) U.S. Cl. ........................ 375/146; 370/320; 398/78; 375/136; 375/135; 375/147
(58) Field of Search ................................. 375/146, 316, 375/296

(56) References Cited

U.S. PATENT DOCUMENTS

| | | | | |
|---|---|---|---|---|
| 5,727,026 A | * | 3/1998 | Beukema | 375/296 |
| 5,838,732 A | * | 11/1998 | Carney | 375/297 |
| 5,991,618 A | * | 11/1999 | Hall | 455/425 |
| 6,091,932 A | * | 7/2000 | Langlais | 725/111 |
| 6,236,864 B1 | * | 5/2001 | McGowan et al. | 455/522 |
| 6,356,146 B1 | * | 3/2002 | Wright et al. | 330/2 |
| 6,590,906 B1 | * | 7/2003 | Ishida et al. | 370/480 |
| 6,654,427 B1 | * | 11/2003 | Ma et al. | 375/297 |

FOREIGN PATENT DOCUMENTS

| | | |
|---|---|---|
| EP | 1091516 | 4/2000 |
| WO | 9959265 | 5/1999 |
| WO | 0033477 | 11/1999 |
| WO | 0054428 | 3/2000 |
| WO | 0211283 | 8/2001 |

* cited by examiner

*Primary Examiner*—Stephen Chin
*Assistant Examiner*—Harry Vartanian

(57) ABSTRACT

A peak power regulator is disclosed that functions within a Code Division Multiple Access (CDMA) transmitter to reduce peak power spikes within baseband signals, controlling the out-of-band emissions, and maintaining the in-band signal quality within an acceptable degradation. In-phase and quadrature baseband signals are input to an envelope magnitude predictor within the peak power regulator. The envelope magnitude predictor outputs an estimate for the magnitude of the envelope that will be generated when the inputted baseband signals are modulated. This estimate is input to a multiplier that generates a ration by dividing the estimate by a maximum acceptable envelope magnitude. The ratio is subsequently input to a mapping table that outputs a scaling factor sufficient for reducing peak power spikes. The scaling factor is subsequently subtracted from a value of one and multiplied by first delayed versions of the in-phase and quadrature baseband input signals. The outputs from these multiplication operations, after being filtered within lowpass filters to remove out-of-band emissions caused by the operations, are referred to as excess power correction signals. These excess power correction signals are then subtracted from second delayed versions of the in-phase and quadrature baseband input signals to generate in-phase and quadrature baseband output signals.

46 Claims, 14 Drawing Sheets

PEAK POWER AND ENVELOPE MAGNITUDE REGULATORS AND CDMA TRANSMITTERS FEATURING SUCH REGULATORS

This application is a Continuation-in-Part of co-pending application Ser. No. 09/200,759 entitled "PEAK POWER AND ENVELOPE MAGNITUDE REGULATORS AND CDMA TRANSMITTERS FEATURING SUCH REGULATORS", filed on Nov. 27, 1998 by the inventors of the present application and assigned to the assignee of the present application.

FIELD OF THE INVENTION

This invention relates generally to control of power and more specifically to peak power regulation.

BACKGROUND OF THE INVENTION

The use of Code Division Multiple Access (CDMA) technology is increasing within wireless applications such as cellular and Personal Communication Systems (PCS). Its utilization will continue to be significant as CDMA technology is incorporated within new standards such as the third generation (3G) Direct Spreading (DS)—CDMA communication system currently being defined. In CDMA technologies, multiple users and/or multiple data streams of each user, which each transmit information on a different code channel, share the same frequency channel, hereinafter referred to as a carrier. Furthermore, CDMA transmitters may also utilize multiple carriers, and therefore, multiple CDMA carriers share the same power amplifier and other components within a particular transmitter. This sharing of carriers between users and/or the sharing of power amplifiers and other components between carriers cause compounded signals to have a high Peak to Average Power Ratio (PAPR) to be processed by said components. In the 3G DS-CDMA standards, multiple code channels share the same carrier within 3G mobile stations. Hence, similar to that for a base station, compounded signals with potentially high PAPR are input to the power amplifiers of 3G mobile stations.

In order to meet the out-of-band emissions requirements, a power amplifier and other components with this high PAPR input is required to provide good linearity in a large dynamic range. This makes the power amplifier one of the most expensive components within the communication system. The high PAPR also means that the power amplifier operation has low power efficiency. When considering the 3G DS-CDMA case, this low power efficiency reduces the battery life time for 3G mobile stations.

An apparatus is thus needed that can reduce the PAPR of CDMA signals input to power amplifiers. Such a device should reduce the peaks of the compounded input signals such that a less expensive power amplifier can be utilized with out-of-band emissions still being fully controlled. This device should also be relatively inexpensive and any degradation in terms of in-band signal quality should be within an acceptable range.

SUMMARY OF THE INVENTION

The present invention is directed to peak power and envelope magnitude regulators that function preferably within a Code Division Multiple Access (CDMA) transmitter. These regulators operate to reduce peak power spikes within input signals, controlling the out-of-band emissions, and maintaining the in-band signal quality within an acceptable degradation.

The present invention, according to a first band aspect, is a peak power regulator, input with at least one input signal, that outputs at least one output signal corresponding to the input signal. The power regulator, in this aspect, consists of a first and second delay apparatus a power estimation apparatus, a scaling factor generator, an excess power correction generator, a filtering apparatus and an excess power removal apparatus. The first and second delay apparatus generate first and second delayed signals corresponding to the input signal. The power estimation apparatus generates, with use of the input signal, an overall input power estimation signal corresponding to the input signal. The scaling factor generator generates a scaling factor with use of the overall input power estimation signal and a maximum acceptable power signal. The excess power correction generator utilizes the scaling factor and the first delayed signal to generate an excess power correction signal. The filtering apparatus filters the excess power correction signal to generate a filtered excess power correction signal. And, the excess power removal apparatus utilizes the filtered excess power correction signal and the second delayed signal to generate the output signal.

According to a second broad aspect, the present invention is an envelope magnitude regulator, input with at least one IF input signal, that outputs at least one IF output signal corresponding to the IF input signal. In this aspect, the envelope magnitude regulator includes first and second delay apparatus, an envelope magnitude estimation apparatus, a scaling factor generator, an excess power correction generator, a filtering apparatus and an excess power removal apparatus. The envelope magnitude regulator generates first and second delayed IF signals corresponding to the IF input signal. The envelope magnitude estimation apparatus generates, with use of the IF input signal, an overall input envelope magnitude estimation signal corresponding to the IF input signal. The scaling factor generator generates a scaling factor with use of the overall input envelope magnitude estimation signal and a maximum acceptable envelope magnitude signal. The excess power correction generator utilizes the scaling factor and the first delayed IF signal to generate an excess power correction signal. The filtering apparatus filters the excess power correction signal to generate a filtered excess power correction signal. And, the excess power removal apparatus that utilizes the filtered excess power correction signal and the second delayed IF signal to generate the IF output signal.

The present invention, according to a third broad aspect, is a method for regulating output power in a peak power regulator, input with at least one input signal, that outputs at least one output signal corresponding to the input signal. In this aspect, the method includes estimating the overall input power level corresponding to the input signal, generating a scaling factor with use of the estimate of the overall input power level and a maximum acceptable input power signal, delaying the input signal by a first amount, generating an excess power correction signal with use of the scaling factor and the input signal delayed by the first amount, filtering the excess power correction signal, delaying the input signal by a second amount larger than the first amount and generating the output signal with use of the input signal delayed by the second amount and the filtered excess power correction signal.

In other aspects, the present invention is a CDMA transmitter incorporating a peak power regulator or envelope magnitude regulator according to one of the above aspects of the present invention.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The invention will now be described with reference to the following figures, in which:

FIG. 4b is an alternative embodiment for the envelope magnitude predictor used in the multi-carrier Baseband PPR block of FIG. 4a;

DETAILED DESCRIPTION OF THE PREFERRED EMBODIMENTS

Figure 1:
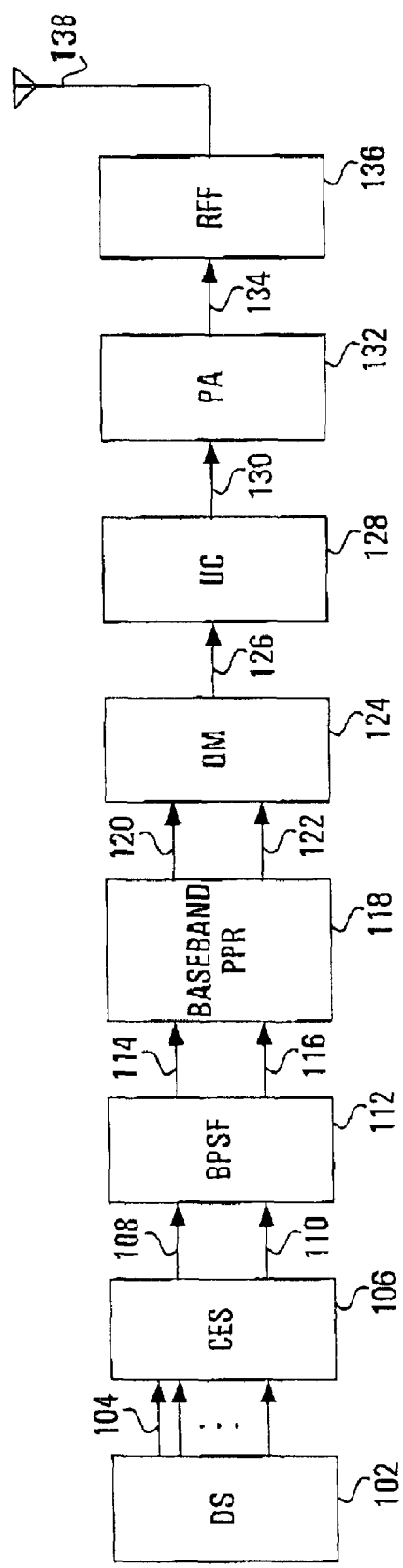
FIG. 1 is a block diagram of a single carrier transmitter according to an embodiment of the present invention.

Embodiments of the present invention are directed to Peak Power Retention (PPR) blocks that can be implemented within CDMA transmitters. Although the embodiments of the present invention described herein below are incorporated within CDMA transmitters, the present invention is not limited to such an implementation. For example, the PPR blocks according to the present invention can be utilized in any transmitter in which peak power reduction and control of out-of-band emissions is required.

A single channel CDMA transmission using a Baseband Peak Power Reduction (PPR) block according to an embodiment of the present invention is now described with reference to FIG. 1. A Data Source (DS) 102 generator data streams 104 for transmission on multiple code channels corresponding to multiple users and/or multiple data streams for each user. These data streams 104 from the DS 102 are encoded, spread, and combined within a Channel Encoder and Spreader (CES) 106 which outputs an in-phase (I) baseband signal 108 and a quadrature (Q) baseband signal 110. The I and Q baseband signals 108,110 are then pulse shaped by a Baseband Pulse Shaping Filter (BPSF) 112 that outputs pulse shaped I and Q baseband signals 114,116 to a Baseband PPR block 118, implementations of which are described in detail herein below with respect to FIGS. 2, 8a and 8b. The outputs from the Baseband PPR block 118 are peak power reduced baseband signals 120,122 which are subsequently modulated within a Quadrature Modulator (QM) 124. The output signal 126 from the QM 124 is input to an Up-Converter (UC) 128 which shifts the frequency of the signals to the desired transmitting frequency. The up-converted signal 130 output from the UC 128 is input to Power Amplifier (FA) 132. The output signal 134 from the PA 132 is filtered by an RF Filter (RFF) 136 before being transmitted to the air through an antenna 138.

It is well known that the UC 128 may involve multiple stage up-conversion operations. Also, not shown within FIG. 1 is the conversion of the data information signal from digital to analog format. This conversion is preferably done either between the Baseband PPR block 118 and the QM 124 or anywhere between the QM 124 and the final up-conversion stage of the UC 128. In other embodiments of the present invention, described in detail herein below with reference to FIGS. 5, 6, and 7, the Baseband PPR block 118 is removed and an Intermediate Frequency (IF) PPR block is include after the QM 124.

Figure 2:
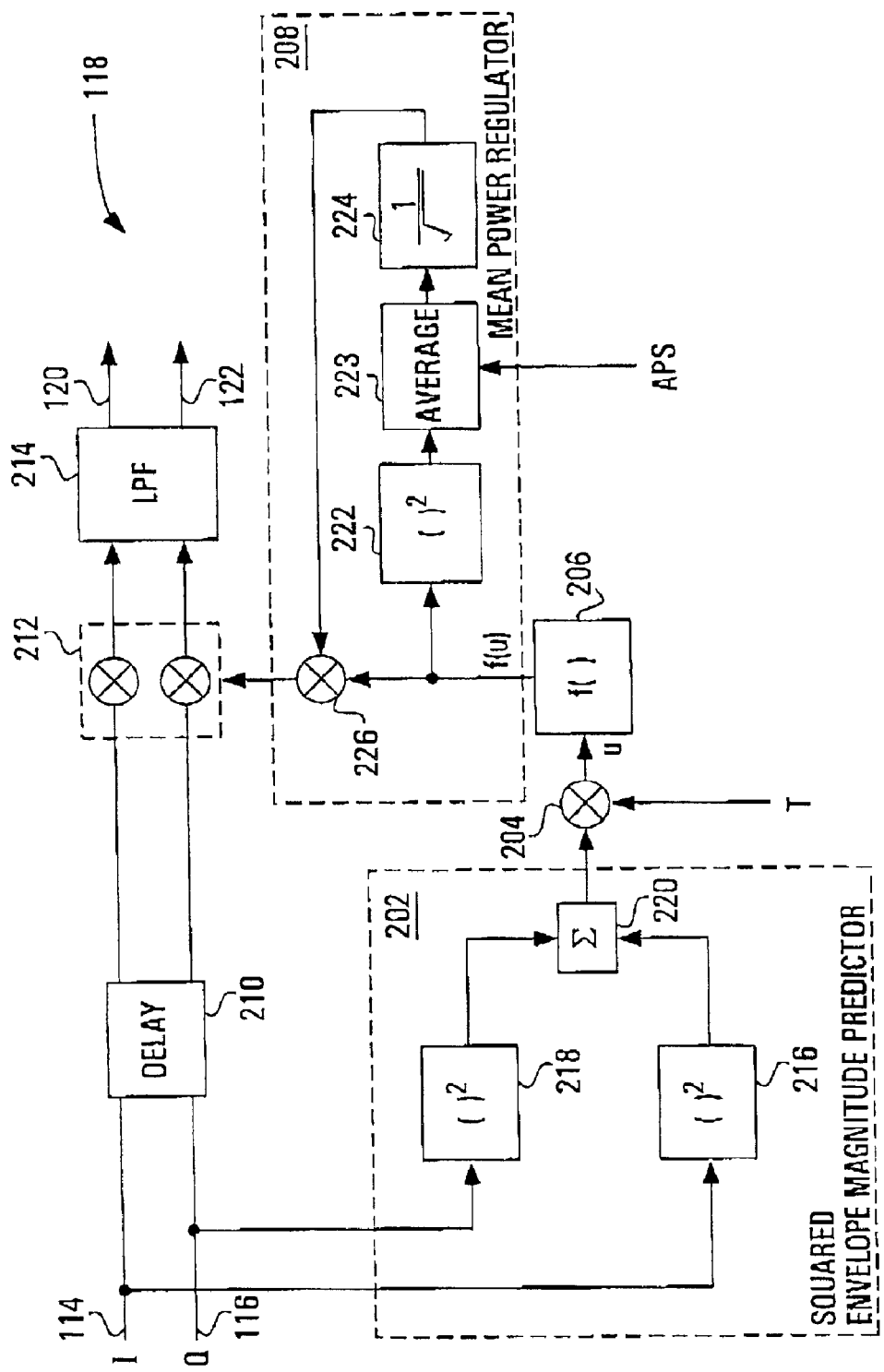
FIG. 2 is a functional block diagram of a first implementation of a single carrier Baseband Peak Power Reduction (PPR) block used in the transmitter of FIG. 1.

FIG. 2 illustrates a first implementation of the Baseband PPR block 118 implemented within the single carrier transmitter depicted in FIG. 1. This Baseband PPR block 118 utilizes nonlinear baseband processing to instantaneously scale and the pulse shaped I and Q CDMA baseband signals 114,116 to within an acceptable threshold range. The scaling of the baseband signals results in the envelope of modulated CDMA signals being equivalently scaled to a pre-configured magnitude threshold after quadrature modulation.

The Baseband PPR block 118, depicted within FIG. 2, comprises a squared envelope magnitude predictor 202 input with the I and Q baseband signals 114,116, a multiplier 204 input with the output from the squared envelope magnitude predictor 202 and a configurable threshold signal T, a mapping table 206 input with the output from the multiplier 204, a mean power regulator 208 input with the output of the mapping table 206, a delay block 210 input with the I and Q baseband signals 114,116, multipliers 212 input with the outputs from the delay blocks 210 and the mean power regulator 208, and a Lowpass Filter (LPF) block 214 input with the outputs from the multipliers 212, that generates the baseband outputs 120,122 to the Baseband PPR block 118 which are subsequently input to the QM 124. The LPF block 214 comprises two LPFs, one for each of the outputs from the multipliers 212.

The squared envelope magnitude predictor 202, which is equivalent to a power estimation apparatus, estimates the squared magnitude of the modulated CDMA waveform envelope that would be formed by the baseband signals 114,116 after quadrature modulation, hereinafter referred to as the square envelope magnitude, and outputs a signal representative of this squared envelope magnitude. The squared envelope magnitude predictor 202, according to this particular implementation, comprises a first squarer 216 that multiplies the I baseband signal 114 by itself, a second square 218 that multiplies the Q baseband signal 116 by itself, and an added 220 that sums the outputs of the first and second squarers 216,218. The output from the adder 220 is a squared envelope magnitude corresponding to the baseband signals 114,116.

The multiplier 204 is utilized to establish a scaling threshold. The configurable threshold T is set to be one divided by the maximum acceptable envelope magnitude, as defined by the designer of the communication system, squared. Subsequent to the actual squared envelope magnitude corresponding to the baseband signals 114,166 being produced within the squared envelope magnitude predictor 202 and input to the multiplier 204, the multiplier 204 generates a ratio u of the actual envelope magnitude squared and the maximum acceptable envelope magnitude squared.

This ratio u is input to the mapping table 206 which generates, with use of a mapping function f, a scaling factor by which the gain of the baseband signals 114,116 should be adjusted to ensure that there are no unwanted power peaks. The mapping function f is defined as follows:

$$f(u) = \begin{cases} 1 & u \leq 1 \\ \dfrac{1}{\sqrt{u}} & u > 1 \end{cases}$$

If the ratio u is less than or equal to one, which indicates that the actual envelope magnitude is less than or equal to the maximum acceptable envelope magnitude, a scaling factor f(u) output from the mapping function f is set to one. If the ratio u is greater than one, indicating that the actual envelope magnitude is larger than the maximum acceptable envelope magnitude, the scaling factor f(u), output from the mapping function f, is set to a value sufficient to lower the power corresponding to the baseband signals 114,116 such that the actual envelope magnitude generated after modulation is equal to the maximum acceptable envelope magnitude. In this case, the output from the mapping table 206 is calculated by taking the inversion of the square root of the ratio u, hence the scaling factor f(u) would be equal to the maximum acceptable envelope magnitude divided by the prediction of the actual envelope magnitude. The mapping function f can be implemented using a look-up table or, alternatively, with the use of logic circuits.

The mean power regulator 208 is not critical for the operation of the PPR block, but is an optional block utilized to maintain a mean output power for the Baseband PPR block 118 consistent with the mean input power, despite the peak power spikes being scaled down. The mean power regulator 208, according to the particular implementation of FIG. 2, comprises a squaring block 222 coupled in series with an average generator 223 and an inverted square root block 224, with the output of the inverted square root block 224 being input along with the output of the mapping table 206 into a multiplier 226.

The squaring block 222 is input with the scaling factor f(u) generated within the mapping table 206 and generates an output $f^2(u)$ that corresponds to the scaling factor after being multiplied by itself, hereinafter referred to as a Squared Scaling Factor (SSF).

The average generator 223 functions to determine the average SSF generated at the squaring block 222. There are a number of possible implementations for the average generator 223. Within one embodiment, the average generator 223 sums N generated SSFs and subsequently divides the result by N, where N is the period of the average. In the implementation of FIG. 2, the designer of the communication system inputs an Average Period Setting (APS) signal to the average generator 223 which determines the value for N. In an exemplary implementation of this average generator 223, a rotating window of dimension N is utilized that allows a continuous summing and dividing algorithm to proceed. In this algorithm, the newest generated SSF replaces the oldest generated SSF within the rotating window, hence maintaining the dimension of the window at N and ensuring the average SSF estimation is sufficiently accurate. Other implementations have an average generator 223 implemented with use of various types of LPFs.

The output signal from the average generator 223, representing the average SSF, is input to the inverted square root block 224. The square root block 224 outputs a signal corresponding to a square root of the inverted average of SSFs, hereinafter referred to as the inverted Root Mean Squared (RMS) scaling factors.

The inverted RMS scaling factors generated at the inverted square root block 224 are multiplied in the multiplier 226 with the current scaling factor f(u) output from the mapping table 206 to produce an instantaneous gain value that is input to each of the multipliers 212 in order to scale the baseband signals 114,116. The instantaneous gain value is a ratio between the current scaling factor f(u) and the RMS scaling factor and is used to scale both the I baseband signal 114 and the Q baseband signal 116. The results from the multipliers 212, in the implementation of FIG. 2, have all power peaks reduced and have the average output power consistent with the average input power. Without the use of the mean power regulator 208, the average output power from the Baseband PFR block 118 would be lower than the average input power since the power during periods of power peaks would be reduced without adding additional power during periods of no power peaks. The mean power regulator 208 increases the instantaneous gain value at all times by the average reduction in power over all periods including peak power periods, hence fully compensating for the reduction in average power.

The well understood LPF block 214, coupled to the outputs of the multipliers 212 is used to remove the out-of-band emissions caused by the processing within the Baseband PPR block 118. The delay block 210, coupled between the baseband signals 114,116 and the multipliers 212, is used to delay the baseband signals such that the baseband signals 114,116 are exactly aligned with the instantaneous gain values produced by the multiplier 226.

One skilled in the art would understand that the multiplier 204 combined with the mapping table 206 and possibly combined with the mean power regulator 208 can be seen as a scaling factor generator. As well, it should be understood that the multipliers 212 and the LPF block 214 can be seen as a power scaling apparatus and a filtering apparatus respectively.

Although the description of the single carrier Baseband PPR block 118 depicted within FIG. 2 is consistent with one implementation, it is recognized that modifications can be made. For example, as described previously, the mean power regulator 208 is removed within some alternative embodiments. This results in the average output power from the Baseband PPR block 118 not necessarily being equal to the average input power. As well, a modification could be made in terms of the location of the square root operation within the mapping function f. An additional square root block in one embodiment is included between the adder 220 and the multiplier 204. To adjust for this change, the configurable threshold signal T is redefined as one divided by the maximum acceptable envelope magnitude and the mapping function f within the mapping table 206 is adjusted to the following:

$$f(u) = \begin{cases} 1 & u \le 1 \\ \dfrac{1}{u} & u > 1 \end{cases}$$

A multi-carrier CDMA transmitter, according to another embodiment of the present invention, using a Baseband PPR block is now described with reference to FIG. 3. The multi-carrier transmitter is similar to the single carrier transmitter depicted within FIG. 1, but the multi-carrier transmitter includes a plurality of pre-modulation carrier paths. In the example shown in FIG. 3, a transmitter with three carriers is depicted, though this is not meant to limit the scope of the present invention.

Within this transmitter, these DSs 302 generate three separate groups of data streams 304, each allowing transmission on multiple code channels corresponding to multiple users and/or multiple data streams for each user. These data streams 304 are encoded, spread, and combined within three respective CESs 306 which each output respective I and Q baseband signals 308,310. These baseband signals 308,310 are then pulse shaped by three respective BPSFs 312, with all outputs being input to a multi-carrier Baseband PPR block 318, implementations of which are described in detail herein below with respect to FIGS. 4a, 4b and 9. Output from the multi-carrier Baseband PPR block 318 are three pairs of peak power reduced I and Q baseband signals 320, 322. Subsequently, each pair of baseband signals 320, 322 are separately quadrature modulated within three respective QMs 324. The output signals 326 from the QMs 324 are input to a combiner 327 to generate a single compounded IF signal input to an UC 328 which shifts the frequency of the signal to the desired transmitting frequency. The up-converted signal 330 from the UC 328 is subsequently power amplified within a Multi-Carrier Power Amplifier (MCPA) 332, with the output signal 334 from the MCPA 332 being filtered by an RFF 336 before being transmitted to the air through an antenna 338.

It is understood that alternative embodiments of the multi-carrier transmitter, similar to those for the single carrier transmitter of FIG. 1, are possible. As in the single carrier transmitter, the multi-carrier transmitter must have an additional stage for converting the signal from digital to analog format. For easier delay alignment, the preferred embodiment of the multi-carrier transmitter of FIG. 3 has the digital to analog conversion between the combiner 327 and the last up-conversion stage, but this should not limit the scope of the present invention.

Figure 3:
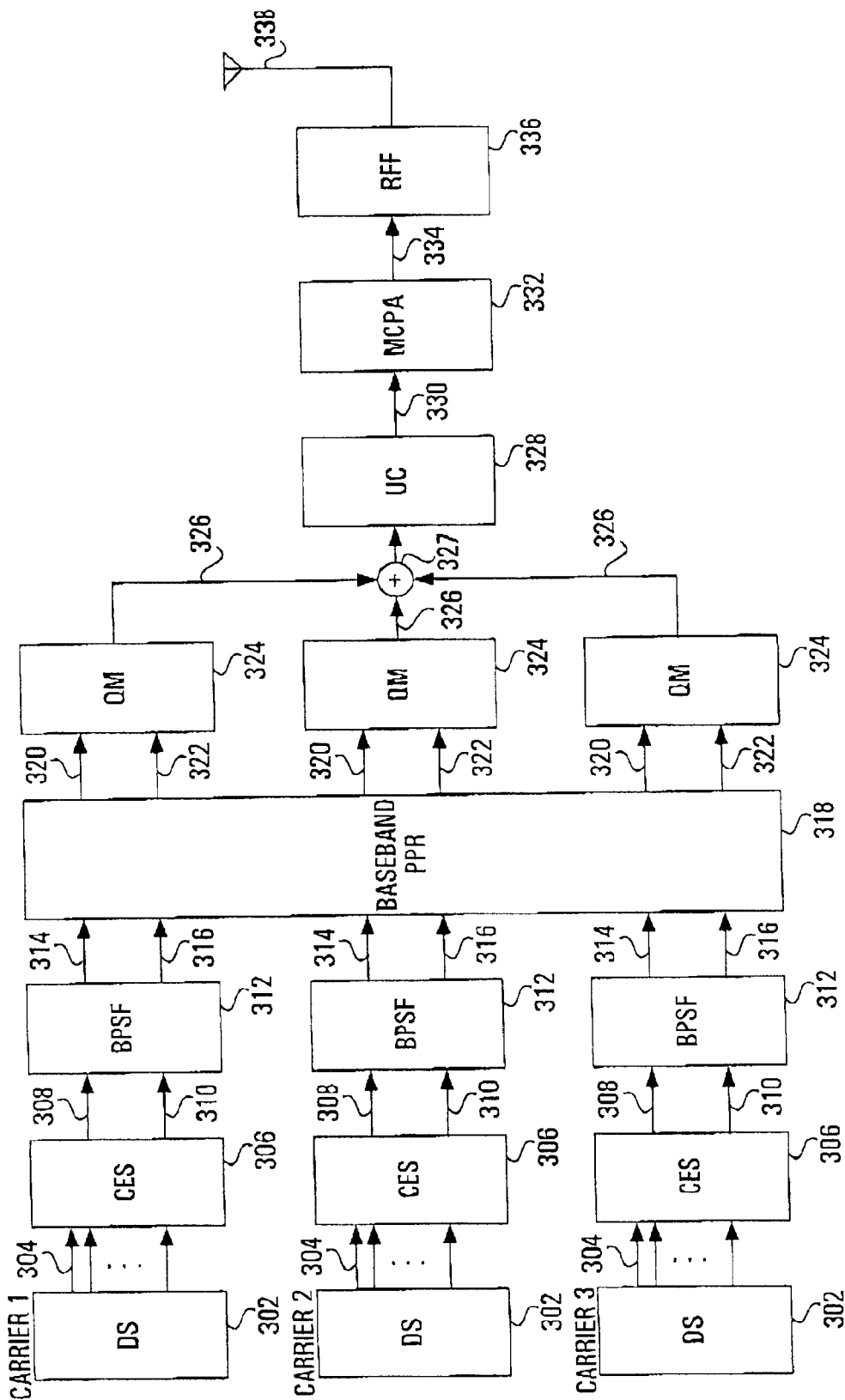
FIG. 3 is a block diagram of a multi-carrier transmitter according to another embodiment of the present invention.

A first implementation of the multi-carrier Baseband PPR block 318 depicted within FIG. 3 is described herein below with reference to FIG. 4a. The overall concept is the same between the single carrier and multi-carrier Baseband PPR blocks 118,318, but the implementation requires modifications. The multi-carrier Baseband PPR block 318 comprises an envelope magnitude predictor 402 coupled in series with a multiplier 404, a mapping table 406, and a mean power regulator 408 within some embodiments; three delay blocks 410; six multipliers 412; and three LPF blocks 414, each LPF block comprising two LPFs.

The envelope magnitude predictor 402 takes as input the three pairs of baseband signals 314,316 output from the BPSFs 312. Each pair of baseband signals 314,316 is input to a pair of squarers 416,418 with the output of the squarers 416,418 being input to respective adders 419. Each set of squarers 416,418 and adders 419 are equivalent to the squared envelope magnitude predictor 202 depicted within FIG. 2. The envelope magnitude predictor 402, within FIG. 4a, further comprises three square root blocks 420 connected in series with the respective adders 419. The outputs from the square root blocks 420 represent the envelope magnitude corresponding to their respective baseband signals 314,316 if the signals were modulated. These outputs are combined within adder 421 to generate a combined envelope magnitude approximation output from the envelope magnitude predictor 402. This approximation is representative of the worst case magnitude of the envelope generated after all three baseband pairs are quadrature modulated and combined. The magnitude prediction for each pair of baseband signals 314,316 generated with squarers 416,418, adders 419, and square root blocks 420 is a two dimensional estimation while the combination of the three individual envelope magnitude estimations is done linearly, as if the individual two dimensional estimations were lined up in phase perfectly. Hence, the final estimation, generated at the output of the adder 421, is the worst case of the individual baseband envelope magnitudes lining up.

Figure 4A:
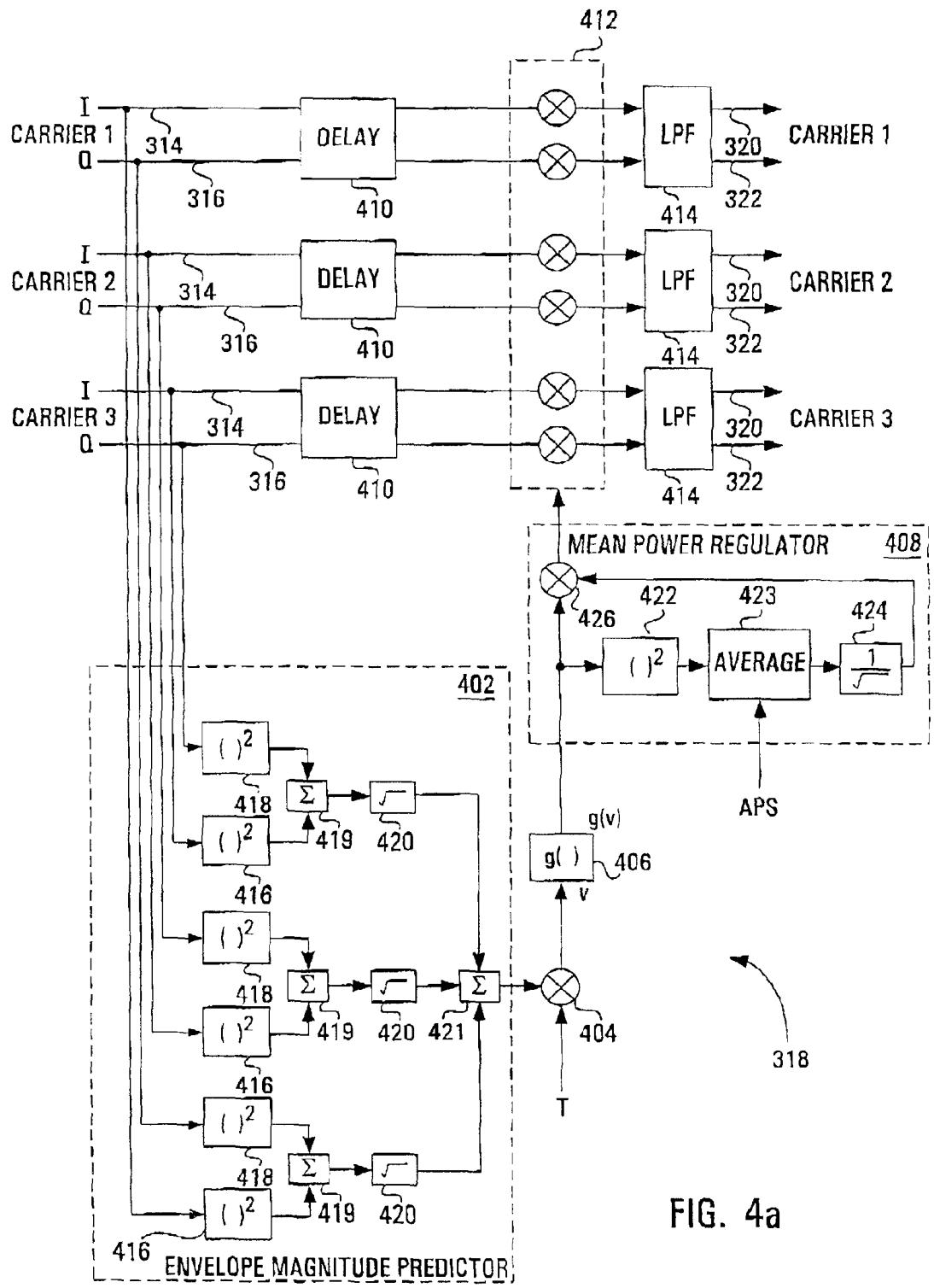
FIG. 4a is a functional block diagram of a first implementation of a multi-carrier Baseband PPR block used in the transmitter of FIG. 3.
Figure 4B:
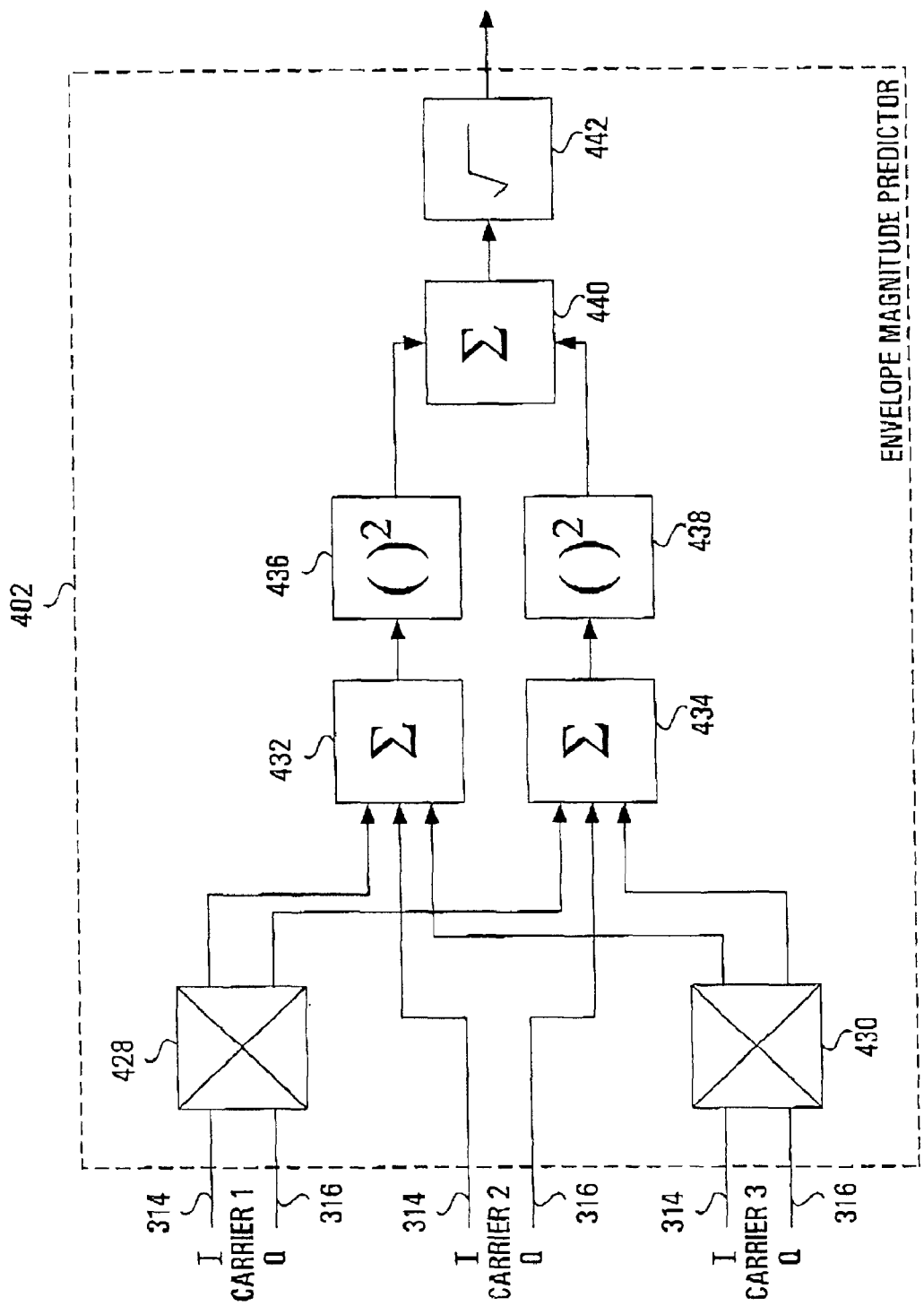

An alternative embodiment for the envelope magnitude predictor 402 is depicted in FIG. 4b. This embodiment accounts for relative frequency and phase information to get an exact envelope magnitude prediction for the combined signal after quadrature modulation. This embodiment requires knowledge from the QMs 324, that being the frequency and phase that will be assigned to each carrier during quadrature modulation.

As shown within FIG. 4b, one pair of baseband signals 314,316 are input to a complex mixer 428, another pair of baseband signals 314,316 are input to a complex mixer 430, and yet another pair of baseband signals 314,316 have the in-phase and quadrature signals input to in-phase and quadrature adders 432,434. In this example with three carriers, the mixers 428,430 shift the frequency and phase of the baseband signals, so that they have the same relative frequency and phase that will occur in their respective QM outputs 326.

The in-phase signals output by complex mixers 428,430 are then input to the in-phase adder 432 and the quadrature signals output by the complex mixers 428,430 are input to the quadrature adder 434. The outputs from the adders 432,434 are input to in-phase and quadrature squarers 436, 438 respectively, with the outputs from the squarers 436,438 being input to an adder 440. The output from the adder 440 is input to a square root block 442 which produces the output to the alternative envelope magnitude predictor of FIG. 4b. The output is an exact prediction of the envelope magnitude that the baseband signals 314,316 would have produced at the output of combiner 327 if they were not scaled by the multi-carrier Baseband PPR block 318. The prediction, in this case, takes into effect the difference in modulating frequency and phase for the different carriers and so is more accurate than that described within FIG. 4a. The disadvantage of the envelope magnitude predictor of FIG. 4b is the increase in complexity.

In other embodiments, with different numbers of carriers, modifications to the envelope magnitude predictor 402 of FIG. 4b can be contemplated. The key in any modification is to maintain the relative frequency and phase between the signals so that the output of the envelope magnitude predictor 402 is an exact prediction of the envelope magnitude that the baseband signals 314,316 would have produced at the output of combiner 327 if they were not scaled by the multi-carrier Baseband PPR block 318. In some alternative embodiments, every pair of baseband signals have a complex mixer associated with it. As well, in some embodiments, the square root block 442 is removed and the square root function is implemented later within the multi-carrier Baseband PPR block 318.

Referring again to FIG. 4a, the output from the envelope magnitude predictor 402 is input to the multiplier 404. Similar to that done for the single carrier PPR block 118 described with reference to FIG. 2, the other input to the multiplier 404 is a configurable threshold signal T. The configurable threshold signal T, within FIG. 4a, is designed to be one over a predetermined maximum acceptable envelope magnitude, such that the output from the multiplier 404 is a ratio v between the actual approximation of the envelope magnitude and the maximum acceptable envelope magnitude.

The mapping table 406 is virtually identical to the mapping table of the single carrier PPR block of FIG. 2, but the square root operation defined within the mapping function f of FIG. 2 has been removed to within the envelope magnitude predictor 402. The mapping table 406 takes as input the ratio v and contains a function g as follows:

$$g(v) = \begin{cases} 1 & v \leq 1 \\ \frac{1}{v} & v > 1 \end{cases}$$

Therefore, if the ratio v is less than or equal to one, which would indicate that the approximate envelope magnitude was less than or equal to the maximum acceptable envelope magnitude, a scaling factor g(v) output from the mapping table 406 would be one. If the ratio v was greater than one, representing the case that the approximation is greater than the maximum acceptable envelope magnitude, then the scaling factor g(v) is set to a value sufficient to lower the power corresponding to the baseband signals 114,116 to a power level such that the actual envelope magnitude generated after modulation and combination of the baseband signals 320,322 is equal to the maximum acceptable envelope magnitude. In this case, the output from the mapping table 406 is one divided by the ratio v and this makes the scaling factor g(v), similar to the scaling factor f(u) in FIG. 2, equal to the maximum acceptable envelope magnitude divided by the prediction of the actual envelope magnitude. As well, the mapping table 406 can also be implemented with use of logic circuits with similar outcomes.

The mean power regulator, similar to that described for FIG. 2, is an optional component of the PPR block implementation being described with reference to FIG. 4a. Similar to that described for FIG. 2, the scaling factor g(v), output from the mapping table 406, is input to the mean power regulator 408 along with an APS signal. The mean power regulator 408 comprises a squaring block 422, input with the scaling factor g(v), in series with an average generator 423 and an inverted square root block 424, with all three blocks functioning, in the implementation depicted within FIG. 4a, as describing above for the mean power regulator 208 within the single carrier Baseband PPR block 118. The outputs from the inverted square root block 424 correspond to inverted RMS scaling factors. Further within the mean power regulator 408 is a multiplexer 426, similar to multiplier 226 within FIG. 2, that is input with the inverted RMS scaling factor from the inverted square root block 424 and the current scaling factor g(u) from the mapping table 406. The multiplier 426 generates an instantaneous gain value, similar to that generated by the multiplier 226 of FIG. 2, input to each of the six multipliers 412.

The multipliers 412 are further input with delayed versions of the baseband signals 314,316 and output there pairs of peak powder reduced baseband signals that are each input to an individual LPF block 414. The LPB blocks 414 are designed to remove the out-of-hand emissions caused by the processing within the Baseband PPR block 318. The delay blocks 410 generate the delayed baseband signals corresponding to the baseband signals 314,316 that are input to the multipliers 412. As with the delay blocks 210 of FIG. 2, the delay blocks 410 are used to exactly align the baseband signals 314,316 with their respective instantaneous gain values produced by multiplier 426.

The multi-carrier Baseband PPR block 318, depicted on FIG. 4a, may be adapted to handle different numbers of carriers and is not limited to the case of three carriers as illustrated and described herein above. In cases that it is modified to handle only a single carrier, the implementation is slightly different to that described with reference to FIG. 2, but it is noted that either implementation would function properly.

Although the two implementation described herein above are for Baseband PPR blocks implemented prior to the modulation of the information signals, other embodiments are possible with the implementation of an Intermediate Frequency (IF) PPR block after the quadrature modulation stage within a transmitter. One implementation of a multi-carrier transmitter that utilizes such an IF PPR block is now described with reference to FIG. 5.

Figure 5:
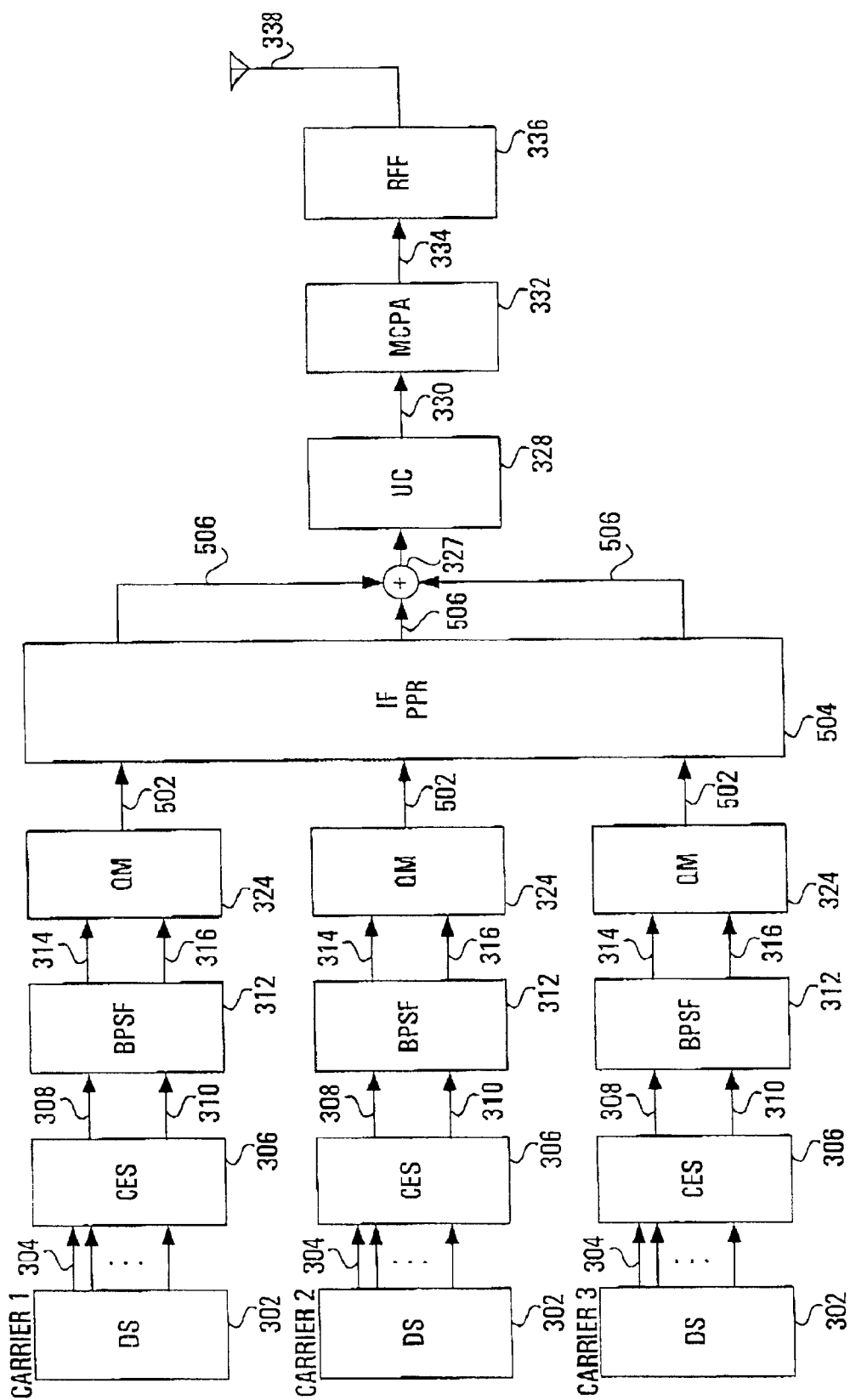
FIG. 5 is a block diagram of a multi-carrier transmitter according to yet another embodiment of the present invention.
Figure 11:
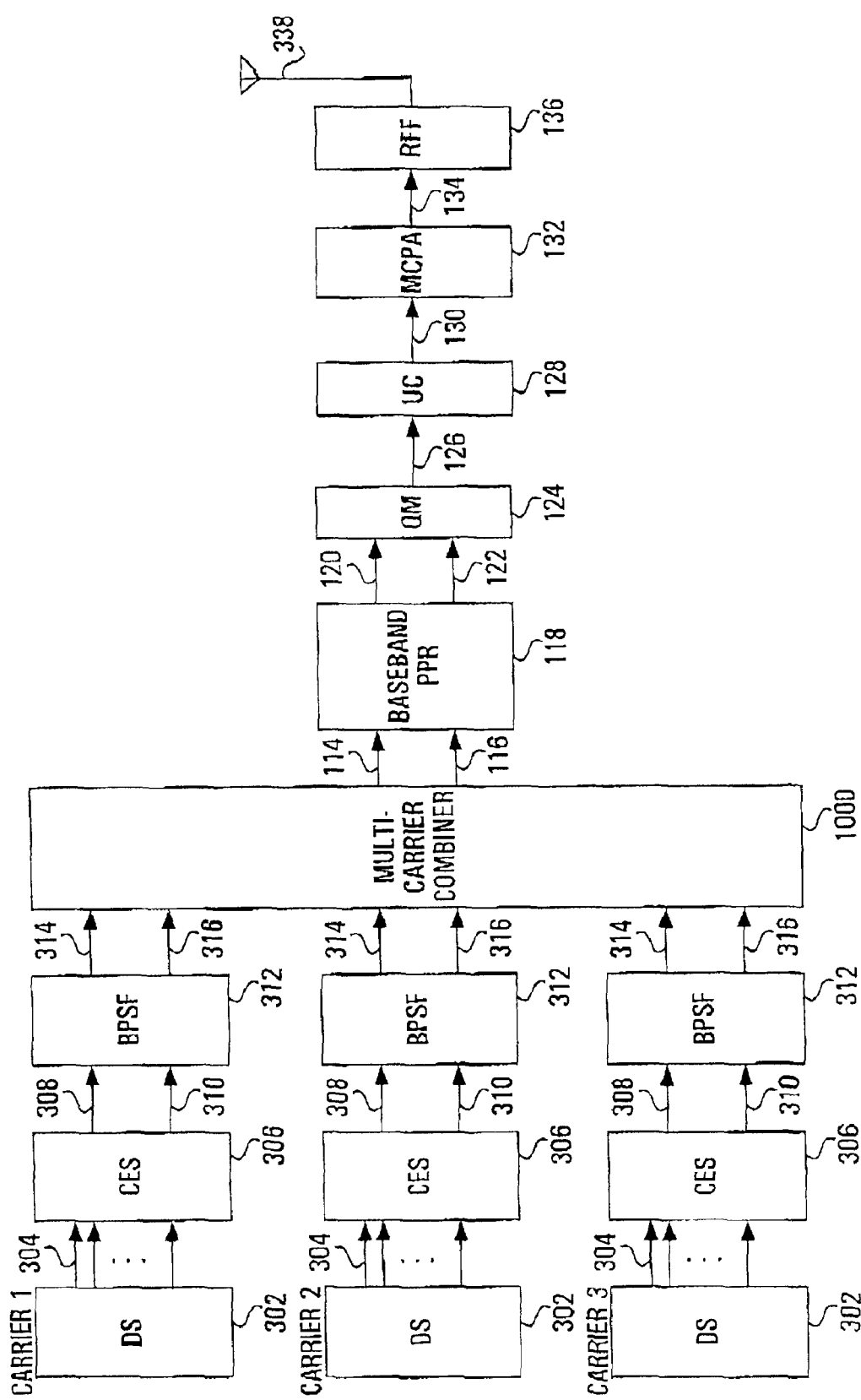
FIG. 11 is a block diagram of a multi-carrier transmitter including the multi-carrier combiner of FIG. 10.

FIG. 5 illustrates a transmitter with three carriers similar to that depicted in FIG. 3, but with the Baseband PPR block 318 removed and an IF PPR block 504, implementations of which will be described herein below in detail with reference to FIGS. 6, 7 and 11, added after the QMs 324. It would be understood by one skilled in the art that the IF PPR block 504 could also be referred to as an envelope magnitude regulator. The change of the PPR blocks modifies the functioning of the transmitter slightly. The pulse shaped baseband signals 314,316, input to the Baseband PPR block 318 in FIG. 3, are now directly input to the QMs 324. Modulated IF outputs 502 from the QMs 324 are input to the IF PPR block 504 with envelope magnitude limited signals 506 subsequently being output to the combiner 327. In the implementation being described, the remaining components of FIG. 5 are identical to those described with reference to FIG. 3. As in FIGS. 1 and 3, a conversion of the data information signals from digital to analog form is required that is not depicted within FIG. 5. This conversion is preferably done after the IF PPR block 504, but before the final up-conversion stage of the UC 328.

A first implementation of the IF PPR block 504, depicted in FIG. 5, is now described with reference to FIG. 6. This IF PPR block 504 comprises an adder 601, an envelope detector 602, a multiplier 604, a mapping table 606, a mean power regulator 608 within an exemplary embodiment, three delay blocks 610, three multipliers 612, and three Bandpass Filters (BPFs) 614. The adder 601, input with each IF signal 502, outputs a combined IF signal to the envelope detector 602, that will be described in detail with reference to FIG. 7.

The output of the envelope detector 602 is an estimation of the envelope magnitude corresponding to the combination of the IF signals 502 and is input to the multiplier 604 along with a configurable threshold signal T. The configurable threshold signal T is equal to one over a maximum acceptable envelope magnitude. Therefore, the output of the multiplier 604 is a ratio v of the estimated overall envelope magnitude to the maximum acceptable envelope magnitude.

This ratio v is input to the mapping table 606 that is identical to the mapping table 406 within FIG. 4a. This mapping table 606 comprises the mapping function g and outputs a scaling factor g(v) as would be output from the mapping table 406.

Figure 6:
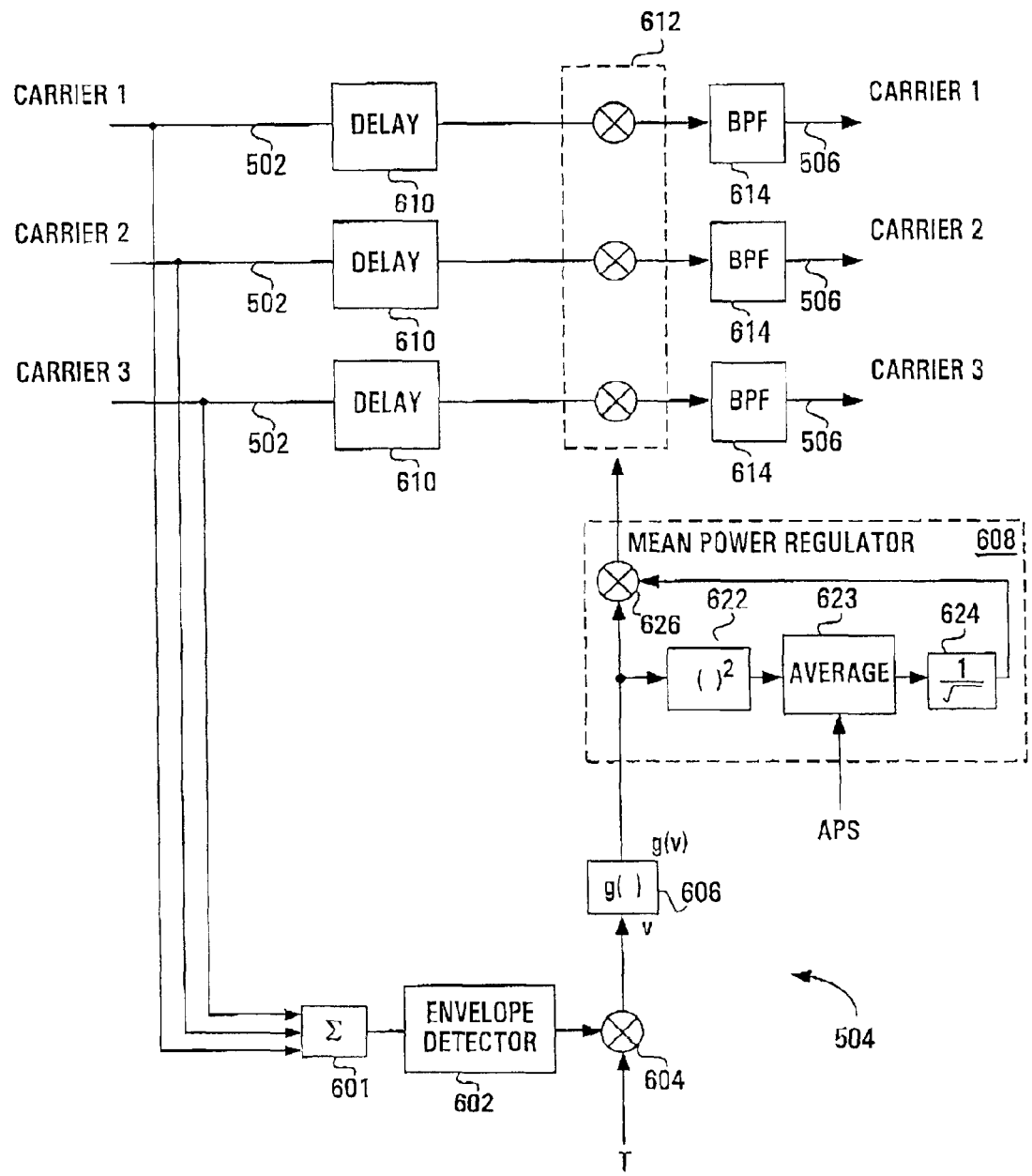
FIG. 6 is a functional block diagram of a first implementation of a multi-carrier Intermediate Frequency (IF) PPR block used in the transmitter of FIG. 5.
Figure 7:
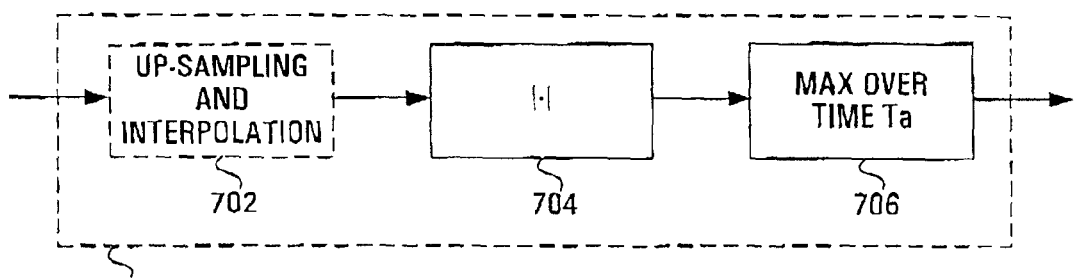
FIG. 7 is a functional block diagram of a possible envelope detector used in the IF PPR block of FIG. 6.

Within an exemplary version of the IF PPR block of FIG. 6, the mean power regulator 608 is utilized in similar fashion as described with mean power regulator 408 within FIG. 4a. The mean power regulator 608 comprises squaring block 622 input with the scaling factor g(v), average generator 623 input with the output from the squaring block 622 and an APS signal, an inverted square root block 624 input with the output from the average generator 623, and a multiplier 626 input with the current scaling factor g(v) from the mapping table 606 and the inverted RMS scaling factor output from the inverted square root block 624. All of these components within the main power regulator 608 operate identically to those within the mean power regulator 408 of FIG. 4a.

The output from the multiplier 626 is an instantaneous gain value that is input to the multipliers 612 in order to scale the modulated IF signals 502. The multipliers 612 are input with delayed versions of the IF signals 502 and output signals that have high envelope magnitudes reduced and average power unchanged. Each output from the multipliers 612 is input to one of the BPFs 614 which subsequently filters the out-of-band emissions generated through the processing within the IF PPR block 504. The delay blocks 610 are utilized, as in FIGS. 2 and 4a, to delay the input signals to the IF PPR block 504, in this case the IF signals 502, such that the inputs to the multipliers 612 are exactly aligned with the corresponding instantaneous gain values generated at the multiplier 626.

It is noted that the implementation depicted in FIGS. 5 and 6 is only one possible implementation of a transmitter utilizing an IF PPR block. Other embodiments are possible that have the IF PPR block anywhere between the QNs 324 and the MCPA 332 with only slight modifications required within the IF PPR block 504. As well, although not shown, a single carrier transmitter utilizing a single carrier IF PPR block is possible by simply scaling FIGS. 5 and 6 to a single carrier with the combiner 327 in FIG. 5 and the combiner 601 in FIG. 6 removed.

There are numerous implementations for the envelope detector 602 within FIG. 6. One sample implementation of the envelope detector 602, now described with reference to FIG. 7, comprises an optional Up-Sampling and Interpolation (USI) block 702 coupled in series with an absolute value block 704 and a Maximum Value Over Time (MVOT) block 706. In a digital implementation, as described in FIG. 6, the optional USI block 702 may be included within the implementation of the envelope detector 602 in order to increase its accuracy. This increase in accuracy is dependent on the sampling rate relative to the carrier frequency.

The absolute value block 704 utilizes a rectifier to take the absolute value of the bipolar IF signal input from the USI block 702. The rectifier, in a digital implementation, is a logic circuit performing the following function:

$$y(x) = \begin{cases} x & x \geq 0 \\ -x & x < 0 \end{cases}$$

where x is in the input and y is the output. The MVOT block 706, is a well understood block which measures the maximum value output from the absolute value block 704 over a predetermined time period Ta. For good accuracy, Ta should be larger than one cycle of the IF signals 502, preferably significantly larger than the sampling rate of the MVOT block 706, and significantly less than 1/W, where W is the signal bandwidth of the signals 502.

The first implementations for a single carrier Baseband PPR block, a multi-carrier Baseband PPR block and a multi-carrier IF PPR block as described above with reference to FIGS. 2, 4a and 6 operate with one common disadvantage. Although these PPR blocks operate to reduce the incidence of peak power spikes by multiplying delayed versions of the input signals by corresponding scaling factors and subsequently filtering the scaled signals, the filtering operation unfortunately is performed on all signals; whether the input signals required scaling or not. The passband ripple of the filtering apparatus within each of the implementations discussed above will distort all the signals passing through the PPR blocks, resulting in errors within both input signals that required scaling and those that were below the poor threshold level required. Implementations of the PPR block 118, 318, 504 are described herein below with reference to FIGS. 8a, 8b, 9 and 10 according to the present invention which mitigate this problem with the above described implementations.

Figure 8A:
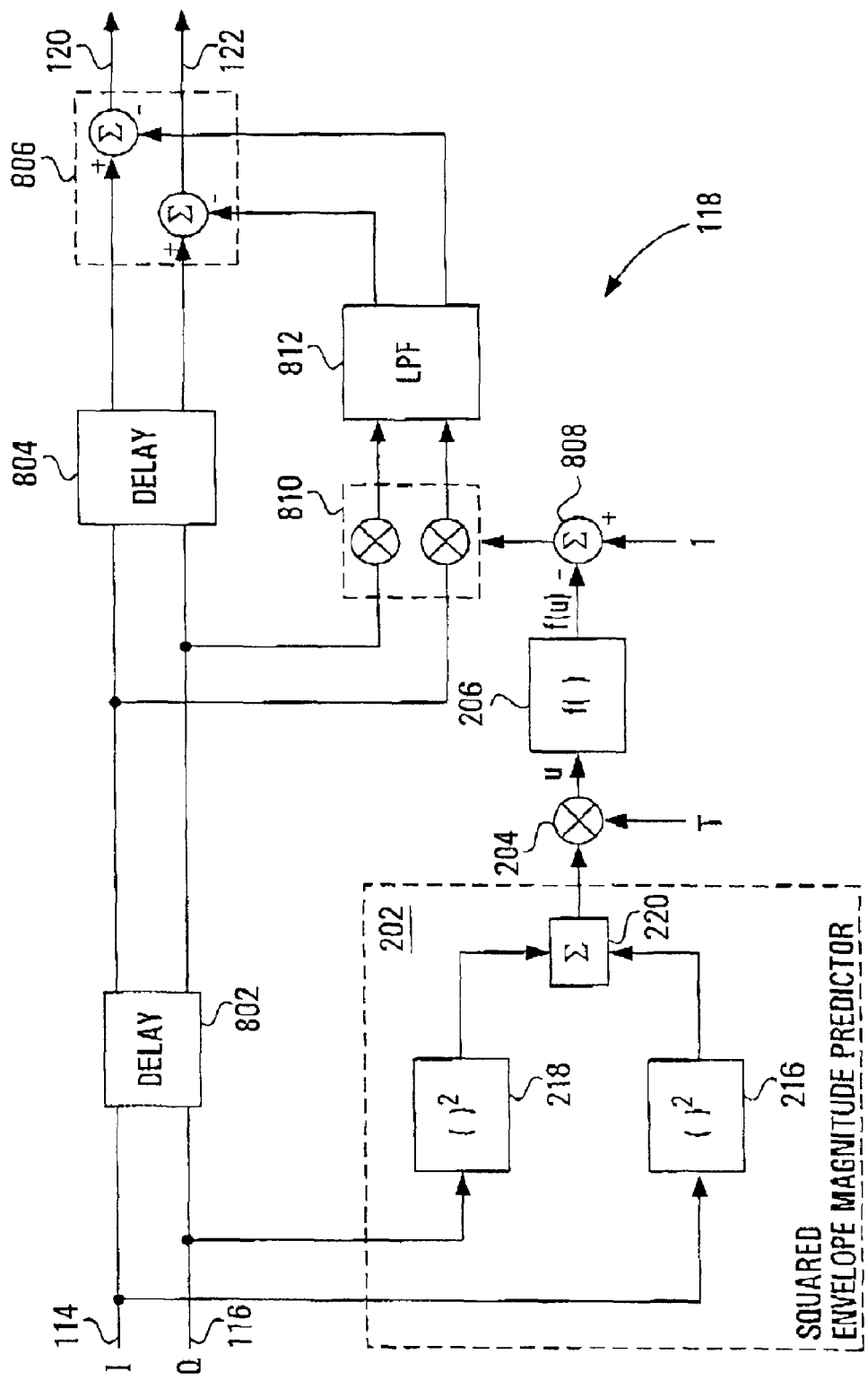
FIG. 8a is a functional block diagram of a second implementation of a single carrier Baseband PPR block used in the transmitter of FIG. 1.
Figure 8B:
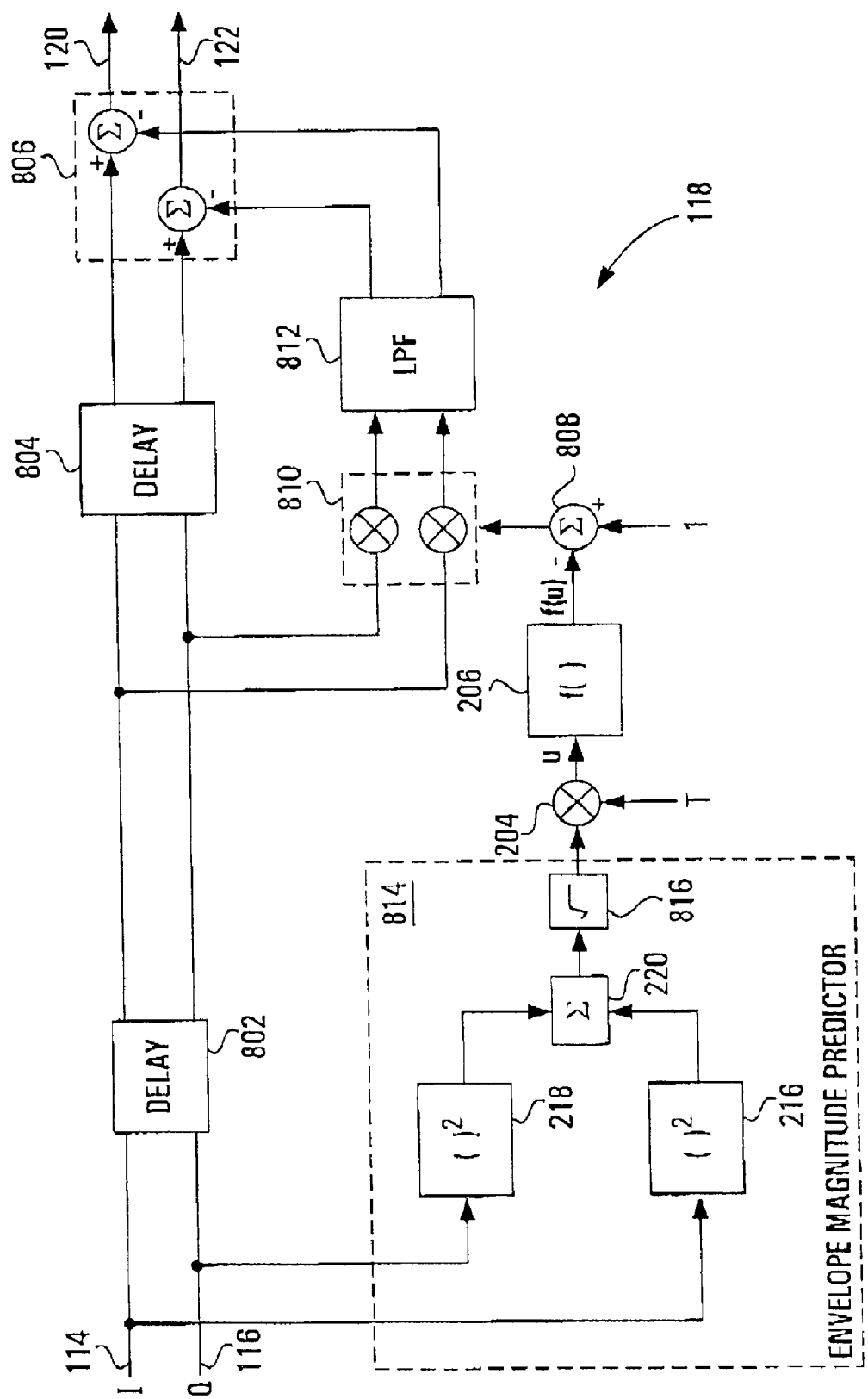
FIG. 8b is a functional block diagram of a third implementation of a single carrier Baseband PPR block used in the transmitter of FIG. 1.

FIG. 8a illustrates a second implementation of the Baseband PPR block 118 implemented within the single carrier transmitter depicted in FIG. 1. Similar to the first implementation of FIG. 2, the single carrier Baseband PPR block of FIG. 8a utilized nonlinear baseband processing to instantaneously scale the pulse shaped I and Q CDMA baseband signals 114,116 to within an acceptable threshold range. One important difference between these two implementations, as will be described below, is the removal of the LPF block from the primary signal path so that Baseband signals that do not require PPR scaling are not deteriorated through unnecessary filtering.

The Baseband PPR block 118, depicted within FIG. 8a, comprises a first delay block 802 input with the I and Q baseband signals 114,116 and coupled in series with a second delay block 804 and a set of two differential adders 806 that generate the baseband outputs 120,122 which are subsequently input to the QM 124. Further, the Baseband PPR block of FIG. 8a comprises the squared envelope magnitude predictor 202 input with the I and Q baseband signals 114,116; the multiplier 204 input with the output from the squared envelope magnitude predictor 202 and a configurable threshold signal T; the mapping table 206 input with the output from the multiplier 204; a differential adder 808 input with a value of one along with the output from the mapping table 206; a set of two multipliers 810 input with the outputs from the first delay block 802 and the output from the differential adder 808; and a Lowpass Filter (LPF) block 812 input with the outputs from the set of multipliers 810 and further coupled to the set of differential adders 806. In this case, the LPF block comprises two LPFs, one for each of the outputs from the multipliers 810.

In the implementation illustrated in FIG. 8a, the squared envelope magnitude predictor 202, the multiplier 204 and the mapping table 206 all operate in the same manner as previously described above for the implementation of FIG. 2. The squared envelope magnitude predictor 202 estimates the squared magnitude of the modulated CDMA waveform envelope that would be formed by the baseband signals 114,116 after quadrature modulation and outputs a signal representative of this squared envelope magnitude. The multiplier 204 receives this signal representative of the squared envelope magnitude and compares it with a scaling threshold T. As described previously for FIG. 2, the configurable threshold T is set to be one divided by the maximum acceptable envelope magnitude, as defined by the designer of the communication system, squared so that the multiplier generates a ratio u of the actual envelope magnitude squared and the maximum acceptable envelope magnitude squared. This ratio u is input to the mapping table 206 which generates, with use of the mapping function f described previously for FIG. 2, a scaling factor f(u).

The scaling factor f(u) is subsequently input to the differential adder 808 along with a value of one. The output from the differential adder is an expression for one subtracted by the scaling factor, that being 1−f(u). If the scaling factor is equal to one, as would be the case in which the actual envelope magnitude squared is less than or equal to the maximum acceptable envelope magnitude squared, the output from the differential adder 808 would be zero. Alternatively, if the scaling factor is less than one, as would be the case in which the actual envelope magnitude squared is greater than the maximum acceptable envelope magnitude squared, the output from the differential adder 808 would be equal to a value between 0 and 1 which represents the percentage (in decimal form) by which the input signals' estimated envelope magnitude must be reduced to equal the maximum acceptable envelope magnitude.

Each of the multipliers 810 receives the output from the differential adder 808 along with a delayed version of one of the input signals 114,116 from the first delay block 802. The first delay block 802 is used to delay the baseband signals 114,116 so that they are exactly aligned with the instantaneous outputs of the differential adder 808, hence comprising for the delays within components 202,204,206 and 808. The outputs from the multipliers 810, hereinafter referred to as excess power correction signals, represent the amount in which the input signals should be reduced in order to ensure that their power peaks above the threshold level are removed. In this case, if the output from the differential adder 808 equals zero, then the excess power correction signal output from the multipliers 810 is null as well; this indicating that no reduction in power within the baseband signals is required. If the output from the differential adder 808 is a value between 0 and 1, then the excess power correction signals output from the multipliers 810 are representative of the portions of the input signals 114,116 that are above the threshold power level.

The LPF block 812 comprises two individual LPFs that each receives one of the excess power correction signals output from the multipliers 810. These LPFs are utilized to remove the out-of-band emissions generated within the excess power correction signals during the processing within the multipliers 810. As depicted within FIG. 8*a*, the filtered outputs of the LPF block 812, hereinafter referred to as filtered excess power correction signals, are input to corresponding ones of the differential adders 806 along with delayed versions of the corresponding ones of the input signals 114,116 from the second delay block 804. The second delay block 804 is used to delay the previously delayed versions of the baseband signals 114,116 from the first delay block 802 so that they are exactly aligned with the instantaneous filtered excess power correction signals output from the LPF block 812, hence compensating for the delays within components 810 and 812. Within the implementation of FIG. 8*a*, each of the differential adders 806 operates to subtract the delayed version of one of the input signals 114,116 from its corresponding filtered excess power correction signal. The results of these subtraction operations of FIG. 8*a* are the baseband outputs 120,122, the baseband outputs 120,122 being excess peak power reduced versions of the corresponding baseband inputs 114,116. It is noted that if no power scaling of the baseband inputs 114,116 is required, the differential adders 806 subtract only a null signal from the delayed versions of the signals. Thus, no change is made to the baseband inputs that do not require power scaling.

Although the description of FIG. 8*a* has been described above for one particular implementation, this should not limit the scope of the present invention. It should be understood that the alternative implementations described above for the squared envelope magnitude predictor 202, the multiplier 204 and the mapping table 206 of FIG. 2 also apply as alternatives within the implementation of FIG. 8*a*. For instance, similar to the implementation described above, it should be recognized that the mapping function f could be implemented using a look-up table or, alternatively, with the use of logic circuits.

Further, a mean power regulator similar to mean power regulator 208 of FIG. 2 could be implemented within FIG. 8*a* in some embodiments. This mean power regulator could be implemented between the mapping table 206 and the differential adder 808. Similar to the apparatus within FIG. 2, a mean power regulator within FIG. 8*a* could be utilized to maintain a mean output power for the Baseband PPR block consistent with the mean input power, despite the peak power spikes being scaled down. If a mean power regulator is implemented within FIG. 8*a* it could be implemented as described above with reference to FIG. 2, though the implementation of the mean power regulator should not be limited to such a design.

Yet further, the square root function that is incorporated within the mapping table 206 of FIG. 8*a* could be moved. For instance, an alternative implementation for these components is illustrated within FIG. 8*b* in which the square root function has been moved prior to the mapping table 206. Within FIG. 8*b*, all of the components of the single carrier Baseband PPR block 118 are the same as those described above for the design in FIG. 8*a*, but with an envelope magnitude predictor 814 replacing the squared envelope magnitude predictor 202 of FIG. 8*a*. In this case, the envelope magnitude predictor comprises the first and second squares 216,218 and the adder 220 similar to the predictor 202 but further comprises a square root operator 816 coupled to the output of the adder 220. The square root operator 816 receives the signal representing of the squared envelope magnitude and outputs a signal representative of the actual envelope magnitude. To adjust for this change in location of the square root function, the configurable threshold signal T is redefined as one divided by the maximum acceptable envelope magnitude for this implementation. Further, the mapping function f within the mapping table 206 is adjusted to the following as described above with reference to the alternatives to the PPR block of FIG. 2;

$$f(u) = \begin{cases} 1 & u \leq 1 \\ \dfrac{1}{u} & u > 1 \end{cases}$$

One skilled in the art would understand that the multiplier 204 combined with the mapping table 206 and possibly combined with a mean power regulator can be seen as a scaling factor generator. Further, it should be understood that the differential adder 808 combined with multipliers 810 can be seen as an excess power correction generator, the LPF block 812 can be seen as a filtering apparatus and the differential adders 806 can be seen as an excess power removal apparatus.

Figure 9:
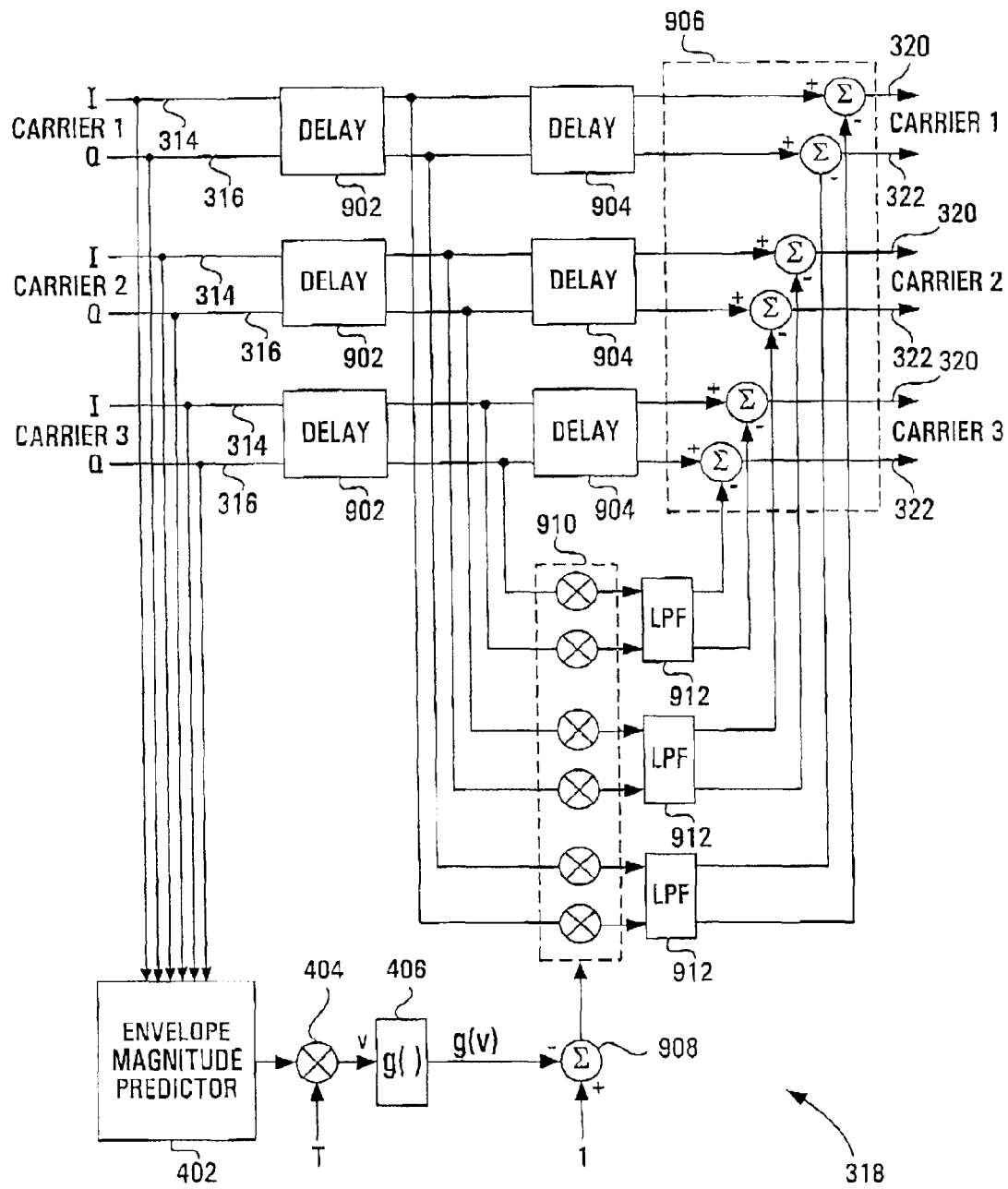
FIG. 9 is a functional block diagram of a second implementation of a multi-carrier Baseband PPR block used in the transmitter of FIG. 3.

Now turning to the multi-carrier transmitter of FIG. 3, FIG. 9 illustrates a second implementation of the multi-carrier Baseband PPR block 318. Similar to the first implementation of FIG. 4*a*, the multi-carrier Baseband PPR block of FIG. 9 utilizes nonlinear baseband processing to instantaneously scale the three pairs of baseband signals 314,316 to within an acceptable threshold range. Similar to FIGS. 8a and 8b, one important difference between the implementation of FIG. 9 and that of FIG. 4a, as will be described below, is the removal of the LPF blocks from the primary signal paths so that Baseband signals that do not require PPR scaling are not deteriorated through unnecessary filtering.

The multi-carrier Baseband PPR block 318, depicted within FIG. 9, comprises three first delay blocks 902 input with respective ones of the three pairs of baseband signals 314,316 and coupled in series with three corresponding second delay blocks 904 and a set of six corresponding differential adders 906 that generate the three pairs of baseband outputs 320,322 which are subsequently input to their corresponding QMs 324. Further, the Baseband PPR block of FIG. 9 comprises the envelope magnitude predictor 402 input with the three pairs of baseband signals 314,316; the multiplier 404 input with the output from the squared envelope magnitude predictor 402 and a configurable threshold signal T; the mapping table 406 input with the output from the multiplier 404; a differential adder 908 input with a value of one along with the output from the mapping table 406; a set of six multipliers 910 input with corresponding outputs from the first delay blocks 902 along with the output from the differential adder 908; and three Lowpass Filter (LPF) blocks 912 input with corresponding outputs from the set of multipliers 910 and further coupled to corresponding ones of the set of differential adders 906. In this case, each of the LPF blocks 912 comprise two LPFs, one for each of the outputs from the multipliers 910.

In the implementation illustrated in FIG. 9, the envelope magnitude predictor 402, the multiplier 404 and the mapping table 406 all operate in the same manner as previously described above for the implementation of FIG. 4a. The envelope magnitude predictor 402 generates a combined envelope magnitude approximation that is representative of the worst case magnitude of the envelope generated after all three baseband pairs are quadrature modulated and combined. The multiplier 404 receives this combined envelope magnitude approximation and compares it with a scaling threshold T. As described previously for FIG. 4a, the configurable threshold T is set to be one divided by a maximum acceptable envelope magnitude, as defined by the designer of the communication system, so that the multiplier generates a ratio v of the approximation of the actual envelope magnitude and the maximum acceptable envelope magnitude. This ratio v is input to the mapping table 406 which generates, with use of the mapping function g described previously for FIG. 4a, a scaling factor g(v).

The scaling factor g(v) is subsequently input to the differential adder 908 along with a value of one. Similar to that described above for FIG. 8a, the output from the differential adder 908 is an expression for one subtracted by the scaling factor, that being 1−g(v). If the scaling factor is equal to one, as would be the case in which the approximation of the actual envelope magnitude is less than the equal to the maximum acceptable envelope magnitude, the output from the differential adder 908 would be zero. Alternatively, if the scaling factor is less than one, as would be the case in which the approximation of the actual envelope magnitude is greater than the maximum acceptable envelope magnitude, the output from the differential adder 908 would be equal to a value between 0 and 1 which represents the percentage (in decimal form) by which the combined input signals' estimated envelope magnitude must be rendered to equal the maximum acceptable envelope magnitude.

Each of the six multipliers 910 receives the output from the differential adder 908 along with a delayed version of a corresponding one of the input signals 314,316 from the first delay block 902. The first delay block 902 is used to delay the three pairs of baseband signals 314,316 so that they are exactly aligned with the instantaneous outputs of the differential adder 908, hence compensating for the delays within components 402,404,406 and 908. The outputs from the multipliers 910, hereinafter referred to as excess power correction signals, represent the amount in which each of the input signals should be reduced in order to ensure that any possible power peaks above the threshold level caused when the pairs of baseband signals are combined are removed. In this case, if the output from the differential adder 908 equals zero, then the excess power correction signal output from the multipliers 910 is null as well; this indicating that no reduction in power within the baseband signals is required. If the output from the differential adder 908 is a value between 0 and 1, then the excess power correction signals output from the multipliers 910 are representative of the portions of the three pairs of input signals 314,316 that possibly could be above the threshold power level when combined.

Each of the three LPF blocks 912 comprise two individual LPFs that each receive a corresponding one of the excess power correction signals output from the multipliers 910. Similar to the LPFs of FIG. 8a, the LPFs of FIG. 9 are utilized to remove the out-of-band emissions generated within the excess power correction signals during the processing within the multipliers 910. As depicted within FIG. 9, the filtered outputs of the LPF blocks 912, hereinafter referred to as filtered excess power correction signals, are input to corresponding ones of the differential adders 906 along with delayed versions of the corresponding ones of the input signals 314,316 from the second delay block 904. The second delay block 904 is used to delay the previously delayed versions of the three pairs of baseband signals 314,316 from the first delay block 902 so that they are exactly aligned with the instantaneous filtered excess power correction signals output from the LPF blocks 912, hence compensating for the delays within components 910 and 912. Within the implementation of FIG. 9, each of the differential adders 906 operates to subtract the delayed version of one of the input signals 314,316 from its corresponding filtered excess power correction signal. The results of these subtraction operations of FIG. 9 are the three pairs of baseband outputs 320,322. Much like that described above for FIG. 8a, if no power scaling of the pairs of baseband inputs 314,316 is required, the differential adders 906 subtract only a null signal from the delayed versions of the signals. Thus, no change is made to the pairs of baseband inputs that do not require power scaling.

Although the description of FIG. 9 has been described above for one particular implementation, this should not limit the scope of the present invention. It should be understood that the alternative implementations described above for the envelope magnitude predictor 402, the multiplier 404 and the mapping table 406 of FIG. 4a also apply as alternatives within the implementation of FIG. 9. For instance, similar to the implementation described above, it should be recognized that the mapping function g could be implemented using a look-up table or, alternatively, with the use of logic circuits.

Further, a mean power regulator similar to mean power regulator 408 of FIG. 4a could be implemented within FIG. 9 in some embodiments. This mean power regulator could be implemented between the mapping table 406 and the differential adder 908. Similar to the apparatus within FIG. 4a, a mean power regulator within FIG. 9 could be utilized to maintain a mean output power for the Baseband PPR block consistent with the mean input power. If a mean power regulator is implemented within FIG. 9 it could be implemented as described above with reference to FIG. 4a, though the implementation of the mean power regulator should not be limited to such a design.

Yet further, the alternative embodiment for the envelope magnitude predictor 402 depicted in FIG. 4b could further be applied within the PPR block of FIG. 9. As described above, this embodiment accounts for relative frequency and phase information to get an exact envelope magnitude prediction for the combined signal after quadrature modulation. This embodiment requires knowledge from the QMs 324, that being the frequency and phase that will be assigned to each carrier during quadrature modulation. As discussed above, a disadvantage of the envelope magnitude predictor of FIG. 4b is the increase in complexity.

The multi-carrier Baseband PPR block 318, depicted in FIG. 9, may be adapted to handle different numbers of carriers and is not limited to the case of three carriers as illustrated and described herein above. In cases that it is modified to handle only a single carrier, the implementation is slightly different to that described with reference to FIG. 8a, but it is noted that either implementation would function properly.

One skilled in the art would understand that the multiplier 404 combined with the mapping table 406 and possibly combined with a mean power regulator can be seen as a scaling factor generator. Further, it should be understood that the differential adder 908 combined with multipliers 910 can be seen as an excess power correction generator, the LPF block 912 can be seen as a filtering apparatus and the differential adders 906 can be seen as an excess power removal apparatus.

Figure 10:
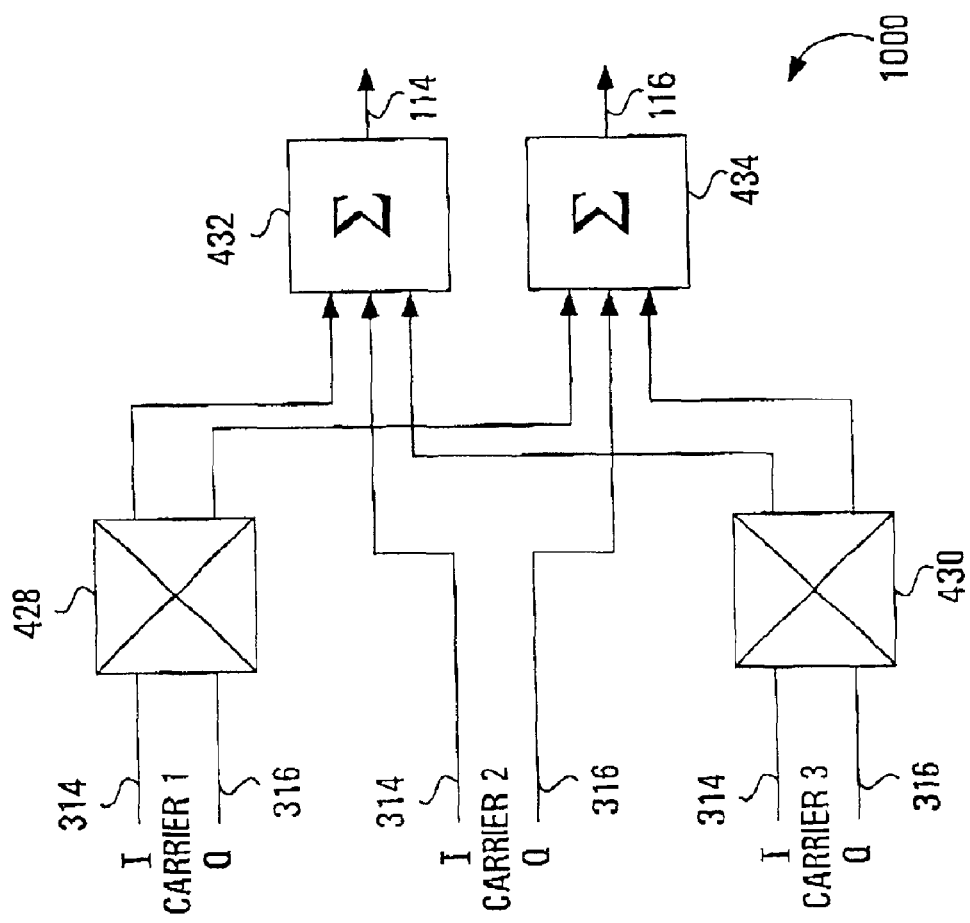
FIG. 10 is a functional block diagram of a multi-carrier combiner that could be used with the single carrier Baseband PPR block of FIGS. 2, 8a and 8b to perform the operation of a multi-carrier Baseband PPR block.

Another technique according to the present invention for performing peak power reduction within a multi-carrier transmitter is to input the baseband input signals 314,316 into a multi-carrier combiner 1000 in order to generate combined single carrier baseband signals 114,116 that can be subsequently input to a single carrier Baseband PPR block 118 such as that described previously with respect to FIGS. 2, 8a and 8b. FIG. 10 illustrates a possible implementation for such a multi-carrier combiner 1000. In this case, complex mixers 428,430 and in-phase and quadrature adders 432,434 are implemented in the same manner as described previously for FIG. 4b. The outputs of the in-phase and quadrature adders 432,434 in this case are the in-phase and quadrature baseband signals 114,116 that can be input within the single carrier Baseband blocks of FIG. 2, 8a or 8b. In the embodiment of the present invention in which the multi-carrier combiner 1000 is coupled to the single carrier Baseband PPR block 118 of one of FIG. 2, 8a, or 8b, a modified transmitter design is required. In this design, as depicted within FIG. 11, the transmitter comprises DSs 302, CESs 306 and BPSFs 312 as described previously for FIG. 3, the BPSFs being coupled to the multi-carrier combiner 1000. The multi-carrier combiner 1000 is coupled to the Baseband PPR block 118 which is further coupled to the QM 124, UC 128, MCPA 132, the RFF 136 and the antenna 138 as previously described with reference to FIG. 1.

It should be understood that alternative implementations of the multi-carrier combiner 1000 of FIG. 10 are possible. For instance, the alternative embodiments of the components 428,430,432,434 described previously further apply to the multi-carrier combiner 1000.

Now turning to the transmitter of FIG. 5, a second implementation of the IF PPR block 504 is now described with reference to FIG. 12. Similar to the first implementation of FIG. 6, the IF PPR block of FIG. 12 utilizes nonlinear baseband processing to instantaneously scale the three carrier signals 502 to within an acceptable threshold range. Similar to FIGS. 8a, 8b and 9, one important difference between the implementation of FIG. 12 and that of FIG. 6, as will be described below, is the removal of the LPF blocks from the primary signal paths so that IF signals that do not require PPR scaling are not deteriorated through unnecessary filtering.

The IF PPR block 504, depicted within FIG. 12, comprises three first delay blocks 1202 input with respective ones of the three IF signals 502 and coupled in series with three corresponding second delay blocks 1204 and a set of three corresponding differential adders 1206 that generate the three IF outputs 506 which are subsequently input to combiner 327. Further, the IF PPR block of FIG. 12 comprises the adder 601 input with the three IF input signals 502; the envelope detector 602 input with the output of the adder 601; the multiplier 604 input with the output from the envelope detector 602 and a configurable threshold signal T; the mapping table 606 input with the output from the multiplier 604; a differential adder 1208 input with a value of one along with the output from the mapping table 606; a set of three multipliers 1210 input with corresponding outputs from the first delay blocks 1202 along with the output from the differential adder 1208; and three Bandpass Filter (BPF) blocks 1212 input with corresponding outputs from the set of multipliers 1210 and further coupled to corresponding ones of the set of differential adders 1206. In this case, each of the BPF blocks 1212 comprise a single BPF.

Figure 12:
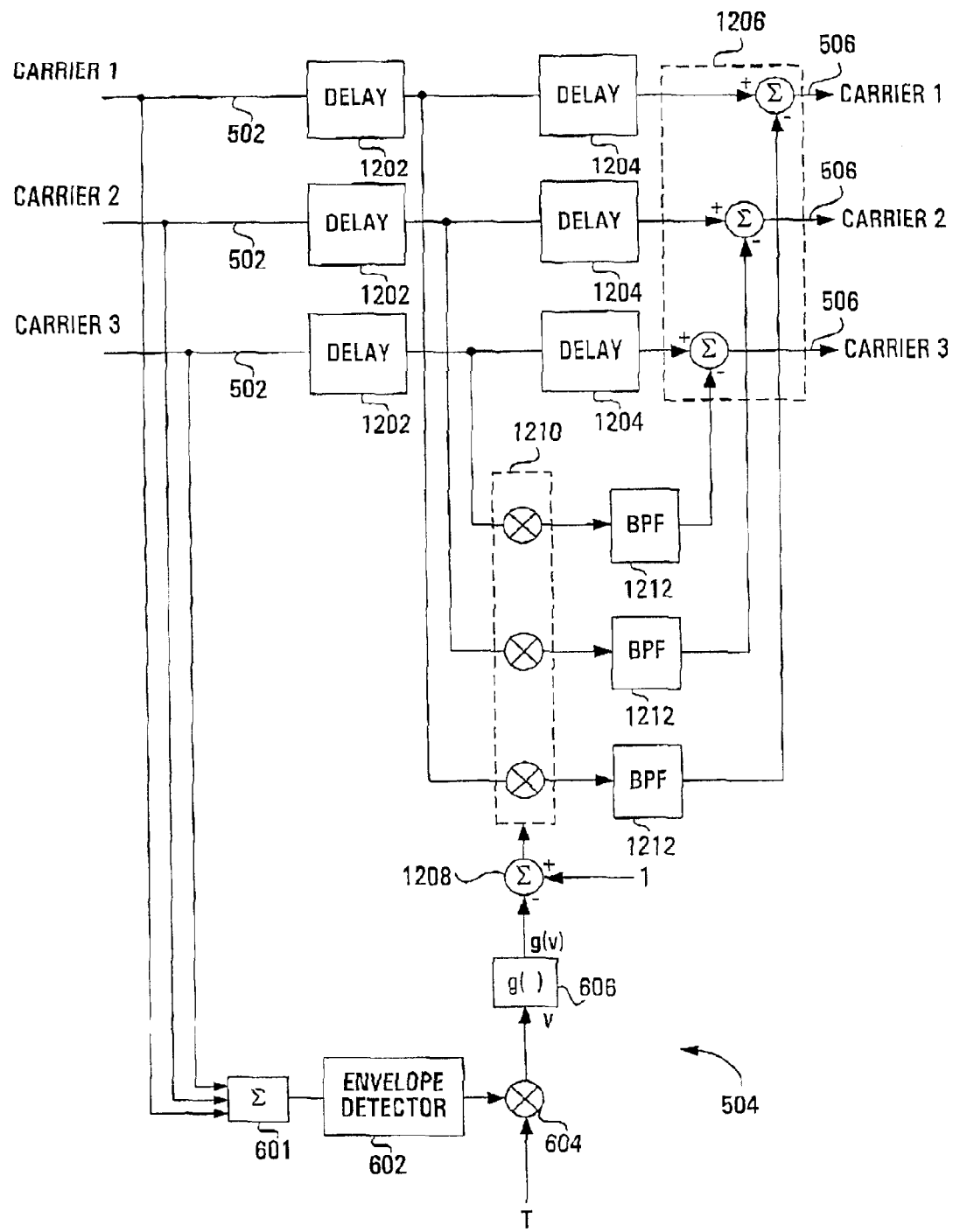
FIG. 12 is a functional block diagram of a second implementation of a multi-carrier IF PPR block used in the transmitter of FIG. 5.

In the implementation illustrated in FIG. 12, the adder 601, the envelope detector 602, the multiplier 604 and the mapping table 606 all operate in the same manner as previously described above for the implementation of FIG. 6. The adder 601, input with each IF signal 502, outputs a combined IF signal to the envelope detector 602. The envelope detector which could be implemented as described above with reference to FIG. 7, outputs an estimation of the envelope magnitude corresponding to the combination of the IF signals 502. The multiplier 604 receives this estimation of the envelope magnitude and compares it with a scaling threshold T. As described previously for FIG. 6, the configurable threshold T is set to be one divided by the maximum acceptable envelope magnitude, as defined by the designer of the communication system, so that the multiplier 604 generates a ratio v of the estimated overall envelope magnitude to the maximum acceptable envelope magnitude. This ratio v is input to the mapping table 606 which generates, with use of the mapping function g described previously for FIGS. 4a and 6, a scaling factor g(v).

The scaling factor g(v) is subsequently input to the differential adder 1208 along with a value of one. Similar to that described above for FIGS. 8a and 9, the output from the differential adder 1208 is an expression for one subtracted by the scaling factor, that being 1−g(v). If the scaling factor is equal to one, as would be the case in which the approximation of the actual envelope magnitude is less than or equal to the maximum acceptable envelope magnitude, the output from the differential adder 1208 would be zero. Alternatively, if the scaling factor is less than one, as would be the case in which the approximation of the actual envelope magnitude is greater than the maximum acceptable envelope magnitude, the output from the differential adder 1208 would be equal to a value between 0 and 1 which represents the percentage (in decimal form) by which the combined input signals' estimated envelope magnitude must be reduced to equal the maximum acceptable envelope magnitude.

Each of the three multipliers 1210 receives the output from the differential adder 1208 along with a delayed version of a corresponding one of the IF input signals 502 from the first delay block 1202. The first delay block 1202 is used to delay the three IF signals 502 so that they are exactly aligned with the instantaneous outputs of the differential adder 1208, hence compensating for the delays within components 601,602,604,606 and 1208. The outputs from the multipliers 1210, hereinafter referred to as excess power correction signals, represent the amount in which each of the input signals should be reduced in order to ensure that any possible power peaks above the threshold level caused when the IF signals are combined are removed. In this case, if the output from the differential adder 1208 equals zero, then the excess power correction signal output from the multipliers 1210 is null as well; this indicating that no reduction in power within the IF input signals 502 is required. If the output from the differential adder 1208 is a value between 0 and 1, then the excess power correction signals output from the multipliers 1210 are representative of the portions of the three IF signals 502 that possibly could be above the threshold power level when combined.

Each of the three LPF blocks 1212 comprise a single LPF that receives a corresponding one of the excess power correction signals output from the multipliers 1210. Similar to the LPFs of FIGS. 8a and 9, the LPFs of FIG. 12 are utilized to remove the out-of-band emissions generated within the excess power correction signals during the processing within the multipliers 1210. As depicted within FIG. 12, the filtered outputs of the LPF blocks 1212, hereinafter referred to as filtered excess power correction signals, are input to corresponding ones of the differential adders 1206 along with delayed versions of the corresponding ones of the IF input signals 502 from the second delay block 1204. The second delay block 1204 is used to delay the previously delayed versions of the three IF input signals 502 from the first delay block 1202 so that they are exactly aligned with the instantaneous filtered excess power correction signals output from the LPF blocks 1212, hence compensating for the delays within components 1210 and 1212. Within the implementation of FIG. 12, each of the differential adders 1206 operates to subtract the delayed version of one of the input signals 502 from its corresponding filtered excess power correction signal. The results of these subtraction operations of FIG. 12 are the three IF output signals 506. Much like that described above for FIGS. 8a and 9, if no power scaling of the IF input signals 502 is required, the differential adders 1206 subtract only a null signal from the delayed versions of the signals. Thus, no change is made to the IF input signals that do not require power scaling.

Although the description of FIG. 12 has been described above for one particular implementation, this should not limit the scope of the present invention. It should be understood that the alternative implementations described above for the envelope detector 602, the multiplier 604 and the mapping table 606 of FIG. 6 also apply as alternatives within the implementation of FIG. 12. For instance, similar to the implementation described above, it should be recognized that the mapping function g could be implemented using a look-up table or, alternatively, with the use of logic circuits.

Further, a mean power regulator similar to mean power regulator 608 of FIG. 6 could be implemented within FIG. 12 in some embodiments. This mean power regulator could be implemented between the mapping table 606 and the differential adder 1208. Similar to the apparatus within FIG. 6, a mean power regulator within FIG. 12 could be utilized to maintain a mean output power for the IF PPR block consistent with the mean input power. If a mean power regulator is implemented within FIG. 12 it could be implemented as described above with reference to FIG. 6, though the implementation of the mean power regulator should not be limited to such a design.

Yet further, as discussed above with reference to FIG. 6, it is noted that other embodiments of transmitters are possible that have the IF PPR block anywhere between the QMs 324 and the MCPA 332 with only slight modifications required within the IF PPR block 504 of FIG. 12. As well, although not shown, a single carrier transmitter utilizing a single carrier IF PPR block is possible by simply scaling the IF PPR block 504 of FIG. 12 to a single carrier with the combiner 601 removed. Further, the IF PPR block 504, depicted in FIG. 12, may be adapted to handle different numbers of carriers and is not limited to the case of three carriers as illustrated and described herein above.

One skilled in the art would understand that the multiplier 604 combined with the mapping table 606 and possibly combined with a mean power regulator can be seen as a scaling factor generator. Further, it should be understood that the differential adder 1208 combined with multipliers 1210 can be seen as an excess power correction generator, the LPF block 1212 can be seen as a filtering apparatus and the differential adders 1206 can be seen as an excess power removal apparatus.

There are numerous advantages to the implementations of the PPR blocks of FIGS. 8a, 8b, 9 and 12, according to the present invention described above. For one, as described above, if no power scaling of the input signals is required, the respective differential adders 806,906,1206 subtract only a null signal from the delayed versions of the signals. Thus, no significant change is made to the inputs that do not require power scaling. In the implementations of the PPR blocks of FIGS. 2, 4a and 6, all signals, whether requiring scaling or not, are filtered by respective filtering apparatus 214,414,614. This filtering can deteriorate the quality of these signals by adding an error component. In the implementation of FIGS. 8a, 8b, 9 and 12, the respective filtering apparatus 812,912,1212 may add a small error to the excess power correction signals, but these correction signals are error correction signals themselves. It is much less damaging to add a slight error to an error signal than to add a slight error to the fundamental signal. Within the PPR blocks of FIGS. 8a, 8b, 9 and 12, no significant error would be added to input signals that do not require scaling and, any error that is added to input signals that do require scaling, is less than the possible error added via the first implementations of these PPR blocks described above with reference to FIGS. 2, 4a and 6.

Another advantage of the second implementations of the PPR blocks of FIGS. 8a, 8b, 9 and 12 is the possibility to reduce the quality of the filtering apparatus that are utilized. For similar reasons as discussed above, the error added to the excess power correction signals by the filtering apparatus within these implementations is not as critical as error added to the actual baseband or IF signals by filtering apparatus within the implementations of FIGS. 2, 4a and 6. The reduced quality requirement within the filtering apparatus allows for a reduced number of bits to be used within the LPFs and BPFs of these apparatus. The reduction in number of bits can reduce the cost of the filters by reducing the number of multipliers and, if the filter design have filters in series, the removal of multipliers could further increase the speed of the filtering apparatus.

It should be noted that although the second implementations of the PPR blocks described above with reference to FIGS. 8a, 8b, 9 and 12 have their filtering apparatus operating on the excess power correction signals, this should not limit the scope of the present invention. For instance, the filtering apparatus could be moved to the output of the differential adders 806,906,1206 within these figures, though it is recognized that this would mute the above described advantages for the second implementations of the PPR blocks.

All of the implementations of the PPR blocks described above which utilize power gain scalers further have advantages over other implementations that utilize hard power limiters. For digital implementations of PPR blocks in which a hard limiter is utilized rather than the scaling implementation of the above described implementations, the hard limiter would create strong harmonics while limiting the power. These strong harmonics would fall back to the Nyquist band and cause significant distortions. As well, a hard limiter must operate with the combined multi-carrier signals. Thus, after the hard limiter operation, the IF signals cannot be individually filtered resulting in inter-carrier distortions caused by the hard limiter not being removed.

There are numerous further advantages gained within the transmitter that utilizes a PPR block according to the present invention. The PPR block scales down the peak power periods while, in the embodiments that utilize a mean power regulator, the PPR block further maintains the average power level, therefore reducing the CDMA Peak-to-Average Power Ratio (PAPR). This reduced PAPR is a significant advantage of the present invention and results in the PA, within the transmitter, being capable of operating at higher average power levels while still satisfying the out-of-band emissions requirements.

Another advantage of the present invention is the flexibility that this implementation has in terms of supporting various numbers of active carriers. In the three carrier examples depicted within FIGS. 4a, 6, 9, 10 and 12 any of the three carriers can be active or inactive with arbitrary relative transmit power between them.

Although the implementations described above are designed to reduce the peak power spikes within input signals to the PPR blocks, it should be noted that the output signals of the PPR blocks may not necessarily have power levels that are consistent with envelope magnitudes less than the maximum acceptable envelope magnitude. This is due to the operation of the filtering apparatus. While the filters remove out-of-band emissions from the excess power correction signals in FIGS. 8a, 8b, 9 and 12 and remove out-of-band emissions from the multiplied signals in FIGS. 2, 4a and 6, the filters also generally slightly increase the power of the peak power spike. For instance, while the entire peak power spikes might be removed if the filtering apparatus was not within the PPR blocks described above, with the filtering apparatus, the peak power spikes may be only reduced by a particular percentage, such as 80%.

To overcome this limitation in the design of the PPR blocks described above, alternatives to the implementations of the PPR blocks of FIG. 2, 4a, 6, 8a, 9 or 12 include a PPR block coupled in series with at least one other PPR block. This coupling of multiple PPR blocks in a cascaded fashion helps to further remove any new peak power spikes that are rebuilt by the filters within the respective PPR blocks.

Although the different embodiments of the present invention depicted herein above have different implementations for the envelope magnitude predictor, it should be understood that the output signal from the envelope magnitude predictor, hereinafter referred to as the overall input power estimation signal, has the magnitude estimation of the overall input power level incorporated within it. This does not necessarily mean that the overall input power estimation signal is equal to the overall input power estimation level, but that it is possibly a manipulated version of the overall power estimation level using a monotonic function. For example, FIG. 2 depicts a case where the overall input power estimation signal is the estimated overall input power level squared. Similarly, a maximum acceptable power signal incorporates the maximum acceptable power level, previously described as the maximum acceptable envelope magnitude, but does not necessarily mean that the maximum acceptable power signal is equal to the maximum acceptable power level.

Depending on the designer's selection of the configurable threshold signal T and the analog power amplifier drive level, the PPR block can be utilized for a number of different purposes. Four different setups for utilizing PPR blocks are now described, these setups are hereinafter referred to as modes A through D.

Within mode A, the average output power of the power amplifier remains constant, with the addition of the PPR block simply reducing the out-of-band emissions while not degrading the in-band waveform quality. In this mode, the PPR block is set using the configurable threshold signal T to clip the information signal no more than the power amplifier would have clipped if the PPR block were not utilized. Only the location of the clipping changes to an earlier stage. Because the LPF(s) within the PPR block removes the out-of-band emissions caused by the PPR scaling and less out-of-band emissions are generated by the power amplifier because of the PPR block, the overall out-of-band emissions are reduced.

Within mode B, the out-of-band emissions are further improved from that of mode A while the same average output power level is used, resulting in a slight degradation of the in-band waveform quality. In this mode, the PPR block clipping depth is increased beyond that originally clipped by the power amplifier without the PPR block. This is done by decreasing the maximum acceptable envelope magnitude as incorporated within the configurable threshold signal T. The combined amount of clipping performed by this setup from the PPR block and the power amplifier is higher than that performed by the power amplifier alone. This reduction in out-of-band emissions is done at a cost within the in-band waveform quality.

Within mode C, the out-of-band emissions are decreased at the same time the average output power from the power amplifier is increased, causing a degradation in the in-band waveform quality to a minimum acceptable level. In this mode, the average output power level is higher than that of mode B, but lower than the power level that results in the out-of-band emissions improvement caused by the addition of the PPR block to be lost. Therefore, both average output power and the out-of-band emissions performance are improved compared to the transmitter implemented without the PPR block while there is an acceptable level of in-band waveform quality degradation.

Within mode D, the average output power for the power amplifier is maximized, while the out-of-band emissions and in-band waveform quality reach their respective worst acceptable limits. In this mode, the configurable threshold signal T and the power amplifier drive level are optimized such that together, the out-of-band emissions reaches its maximum acceptable limit and the in-band waveform quality reaches its minimum acceptable limit, with neither failing. This results in the transmitter implemented with the PPR block reaching the maximum allowable average output power.

Although these four modes are described, one skilled in the art could contemplate other setups for a transmitter with the PPR block of the present invention. The main consideration is the trade off between out-of-band emissions, in-band waveform quality, and average output power.

Persons skilled in the art will appreciate that there are alternative implementations and modifications possible to use an apparatus similar to that described above to reduce peak power periods within data signals, and that the above implementation is only an illustration of this embodiment of the invention. The scope of the invention, therefore, is only to be limited by the claims appended hereto.

I claim:

1. A peak power regulator, input with at least one input signal, that outputs at least one output signal corresponding to the input signal, the power regulator comprising:

first and second delay apparatus that generate first and second delayed signals corresponding to the input signal;

a power estimation apparatus that generates, with use of the input signal, an overall input power estimation signal corresponding to the input signal;

a scaling factor generator that generates a scaling factor with use of the overall input power estimation signal and a maximum acceptable power signal;

an excess power correction generator that utilizes the scaling factor and the first delayed signal to generate an excess power correction signal;

a filtering apparatus that filters the excess power correction signal to generate a filtered excess power correction signal; and an excess power removal apparatus that utilizes the filtered excess power correction signal and the second delayed signal to generate the output signal.

2. The peak power regulator according to claim 1, wherein the scaling factor is equal to one if the scaling factor generator determines the overall input power estimation signal is less than or equal to the maximum acceptable power signal; and wherein the scaling factor is equal to the maximum acceptable power signal divided by the overall input power estimation signal if the scaling factor generator determines the overall input power estimation signal is greater than the maximum acceptable power signal.

3. The peak power regulator according to claim 1, wherein the excess power correction generator comprises a multiplier used to multiply the first delayed signal by a factor equal to one minus the scaling factor in order to generate the excess power correction signal and the filtering apparatus comprises a lowpass filter used to filter the excess power correction signal.

4. The peak power regulator according to claim 1, wherein the excess power removal apparatus comprises a differential adder that subtracts the filtered excess power correction signal from the second delayed signal to generate the output signal.

5. The peak power regulator according to claim 1, wherein the scaling factor generator comprises a first stage apparatus and a second stage apparatus;

wherein the output of the first stage apparatus is equal to one if the first stage apparatus determines the overall input power estimation signal is less than or equal to the maximum acceptable power signal;

wherein the output of the first stage apparatus is equal to the maximum acceptable power signal divided by the overall input power estimation signal if the first stage apparatus determines the overall input power estimation signal is greater than the maximum acceptable power signal; and wherein the output of the second stage apparatus is the scaling factor, the scaling factor being equal to the output from the first stage apparatus divided by a root mean squared (RMS) output from the first stage apparatus over a predetermined period.

6. The peak power regulator according to claim 1, input with in-phase and quadrature baseband input signals, that outputs in-phase and quadrature baseband output signals;

wherein the first and second delay apparatus generate first and second delayed in-phase and quadrature baseband signals;

wherein the power estimation apparatus generates the overall input power estimation signal corresponding to the baseband input signals with use of the baseband input signals;

wherein the excess power correction generator utilizes the scaling factor and the first delayed in-phase and quadrature baseband signals to generate in-phase and quadrature excess power correction signals;

wherein the filtering apparatus filters the in-phase and quadrature excess power correction signals to generate filtered in-phase and quadrature excess power correction signals; and wherein the excess power removal apparatus utilizes the filtered in-phase and quadrature excess power correction signals and the second delayed in-phase and quadrature baseband signals to generate the in-phase and quadrature baseband output signals.

7. The peak power regulator according to claim 6, wherein the power estimation apparatus comprises:

an in-phase baseband square device, input with the in-phase baseband input signal, that outputs a squared in-phase baseband signal;

a quadrature baseband square device, input with the quadrature baseband input signal, that outputs a squared quadrature baseband signal; and an adder, input with the squared in-phase and quadrature baseband signals, that generates the overall input power estimation signal by summing the squared in-phase and quadrature baseband signals;

wherein the overall input power estimation signal corresponds to an overall input power level squared for the combined in-phase and quadrature baseband input signals and the maximum acceptable power signal corresponds to a maximum acceptable power level squared.

8. The peak power regulator according to claim 6, wherein the scaling factor is equal to one if the scaling factor generator determines the overall input power estimation signal is less than or equal to the maximum acceptable power signal; and wherein the scaling factor is equal to the maximum acceptable power signal divided by the overall input power estimation signal if the scaling factor generator determines the overall input power estimation signal is greater than the maximum acceptable power signal.

9. The peak power regulator according to claim 6, wherein the excess power correction generator comprises two multipliers used to multiply both the first delayed in-phase and quadrature baseband signals by a factor equal to one minus the scaling factor to generate the in-phase and quadrature excess power correction signals and the filtering apparatus comprises two lowpass filters used to filter the in-phase and quadrature excess power correction signals.

10. The peak power regulator according to claim 6, wherein the excess power removal apparatus comprises two differential adders that subtract the filtered in-phase and quadrature excess power correction signals from the second delayed in-phase and quadrature baseband signals to generate the in-phase and quadrature baseband output signals.

11. The peak power regulator according to claim 6, wherein the scaling factor generator comprises a first stage apparatus and a second stage apparatus;
  wherein the output of the first stage apparatus is equal to one if the first stage apparatus determines the overall input power estimation signal is less than or equal to the maximum acceptable power signal;
  wherein the output of the first stage apparatus is equal to the maximum acceptable power signal divided by the overall input power estimation signal if the first stage apparatus determines the overall input power estimation signal is greater than the maximum acceptable power signal; and
  wherein the output of the second stage apparatus is the scaling factor, the scaling factor being equal to the output from the first stage apparatus divided by a root mean squared (RMS) output from the first stage apparatus over a predetermined period.

12. A Code Division Multiple Access (CDMA) transmitter comprising:
  a data source coupled in series with a channel encoder and spreader, and a baseband pulse shaping filter;
  a peak power regulator according to claim 6 input with the outputs from the baseband pulse shaping filter, the outputs from the baseband pulse shaping filter corresponding to the in-phase and quadrature baseband input signals; and
  a quadrature modulator, input with the in-phase and quadrature baseband output signals, coupled in series with an up-converter, a power amplifier, a radio frequency filter, and an antenna.

13. A Code Division Multiple Access (CDMA) transmitter comprising:
  a data source coupled in series with a channel encoder and spreader, and a baseband pulse shaping filter;
  a plurality of peak power regulators according to claim 6 coupled in series, a first peak power regulator input with the outputs from the baseband pulse shaping filter, the outputs from the baseband pulse shaping filter corresponding to the in-phase and quadrature baseband input signals; and
  a quadrature modulator, input with the in-phase and quadrature baseband output signals from a last peak power regulator, coupled in series with an up-converter, a power amplifier, a radio frequency filter, and an antenna.

14. A Code Division Multiple Access (CDMA) transmitter comprising:
  a plurality of data sources coupled in series with a plurality of channel encoder and spreaders, and a plurality of baseband pulse shaping filters that each output in-phase and quadrature baseband signals;
  a multi-carrier combiner that combines the in-phase and quadrature baseband signals received from the baseband pulse shaping filters to generate the in-phase and quadrature baseband input signals;
  a peak power regulator according to claim 6; and
  a quadrature modulator, input with the in-phase and quadrature baseband output signals, coupled in series with an up-converter, a power amplifier, a radio frequency filter, and an antenna.

15. The CDMA transmitter according to claim 14, wherein the multi-carrier combiner comprises:
  at least one mixing device, input with the in-phase and quadrature baseband signals from one of the baseband pulse shaping filters, that outputs a pair of mixed in-phase and quadrature baseband signals;
  an in-phase adder, input with the mixed in-phase baseband signal and at least one in-phase baseband signal from another of the baseband pulse shaping filters, that outputs the in-phase baseband input signal; and
  a quadrature adder, input with the mixed quadrature baseband signal and at least one quadrature baseband signal from the other of the baseband pulse shaping filters, that outputs the quadrature baseband input signal.

16. The CDMA transmitter according to claim 14, wherein the multi-carrier combiner comprises:
  a plurality of mixing devices in which each mixing device is input with one pair of in-phase and quadrature baseband signals from one of the baseband pulse shaping filters and outputs a pair of mixed in-phase and quadrature baseband signals;
  an in-phase adder, input with the mixed in-phase baseband signals, that outputs the in-phase baseband input signal; and
  a quadrature adder, input with the mixed quadrature baseband signals, that outputs the quadrature baseband input signals.

17. A Code Division Multiple Access (CDMA) transmitter comprising:
  a plurality of data sources coupled in series with a plurality of channel encoder and spreaders, and a plurality of baseband pulse shaping filters;
  a multi-carrier combiner that combines the outputs from the baseband pulse shaping filters to generate the in-phase and quadrature baseband input signals;
  a plurality of peak power regulators according to claim 6 coupled in series, a first peak power regulator input with the in-phase and quadrature baseband input signals output from the multi-carrier combiner;
  a quadrature modulator, input with the in-phase and quadrature baseband output signals from a last peak power regulator, coupled in series with an up-converter, a power amplifier, a radio frequency filter, and an antenna.

18. The CDMA transmitter according to claim 17, wherein the multi-carrier combiner comprises:
  at least one mixing device, input with the in-phase and quadrature baseband signals from one of the baseband pulse shaping filters, that outputs a pair of mixed in-phase and quadrature baseband signals;
  an in-phase adder, input with the mixed in-phase baseband signal and at least one in-phase baseband signal from another of the baseband pulse shaping filters, that outputs the in-phase baseband input signal; and
  a quadrature adder, input with the mixed quadrature baseband signal and at least one quadrature baseband signal from the other of the baseband pulse shaping filters, that outputs the quadrature baseband input signal.

19. The CDMA transmitter according to claim 17, wherein the multi-carrier combiner comprises:
- a plurality of mixing devices in which each mixing device is input with one pair of in-phase and quadrature baseband signals from one of the baseband pulse shaping filters and outputs a pair of mixed in-phase and quadrature baseband signals;
- an in-phase adder, input with the mixed in-phase baseband signals, that outputs the in-phase baseband input signal; and
- a quadrature adder, input with the mixed quadrature baseband signals, that outputs the quadrature baseband input signals.

20. The peak power regulator according to claim 1, input with a plurality of pairs of in-phase and quadrature baseband input signals, that outputs a plurality of pairs of in-phase and quadrature baseband output signals;
- wherein the first and second delay apparatus generate a plurality of pairs of first and second delayed in-phase and quadrature baseband signals;
- wherein the power estimation apparatus generates the overall input power estimation signal corresponding to the pairs of baseband input signals with use of the pairs of baseband input signals;
- wherein the excess power correction generator utilizes the scaling factor and the pairs of first delayed in-phase and quadrature baseband signals to generate a plurality of pairs of in-phase and quadrature excess power correction signals;
- wherein the filtering apparatus filters the in-phase and quadrature excess power correction signals to generate filtered in-phase and quadrature excess power correction signals; and
- wherein the excess power removal apparatus utilizes the filtered in-phase and quadrature excess power correction signals and the second delayed in-phase and quadrature baseband signals to generate the in-phase and quadrature baseband output signals.

21. The peak power regulator according to claim 20, wherein the power estimation apparatus comprises:
- a plurality of in-phase baseband square devices, each input with one of the in-phase baseband input signals, that output a plurality of squared in-phase baseband signals;
- a plurality of quadrature baseband square devices, each input with one of the quadrature baseband input signals, that output a plurality of squared quadrature baseband signals;
- a plurality of first adders, each input with one of the pairs of squared in-phase and quadrature baseband signals, that sums each pair of squared in-phase and quadrature baseband signals to generate a plurality of first sums;
- a plurality of square root devices, each input with one of the first sums, that square root the first sums to generate a plurality of baseband pair input power estimation signals; and
- a second adder, input with the baseband pair input power estimation signals, that sums the baseband pair input power estimation signals to generate the overall input power estimation signal.

22. The peak power regulator according to claim 20, wherein the power estimation apparatus comprises:
- at least one mixing device, input with one pair of in-phase and quadrature baseband input signals, that outputs a pair of mixed in-phase and quadrature baseband signals;
- an in-phase adder, input with the mixed in-phase baseband signal and at least one in-phase baseband input signal, that outputs an in-phase sum;
- a quadrature adder, input with the mixed quadrature baseband signal and at least one quadrature baseband signal, that outputs a quadrature sum;
- in-phase and quadrature square devices, input with the in-phase and quadrature sums respectively, that outputs squared in-phase and quadrature sums respectively;
- a final adder, input with the squared in-phase and quadrature sums, that generates the overall input power estimation signal.

23. The peak power regulator according to claim 20, wherein the power estimation apparatus comprises:
- at least one mixing device, input with one pair of in-phase and quadrature baseband input signals, that outputs a pair of mixed in-phase and quadrature baseband signals;
- an in-phase adder, input with the mixed in-phase baseband signal and at least one in-phase baseband input signal, that outputs an in-phase sum;
- a quadrature adder, input with the mixed quadrature baseband signal and at least one quadrature baseband input signal, that outputs a quadrature sum;
- in-phase and quadrature square devices, input with the in-phase and quadrature sums respectively, that outputs squared in-phase and quadrature sums respectively;
- a final adder, input with the squared in-phase and quadrature sums, that outputs a final sum; and
- a square root device, input with the final sum, that square roots the final sum to generate the overall input power estimation signal.

24. The peak power regulator according to claim 20, wherein the power estimation apparatus comprises:
- a plurality of mixing devices in which each mixing device, input with one pair of in-phase and quadrature baseband input signals, outputs a pair of mixed in-phase and quadrature baseband signals;
- an in-phase adder, input with the mixed in-phase baseband signals, that outputs an in-phase sum;
- a quadrature adder, input with the mixed quadrature baseband signals, that outputs a quadrature sum;
- in-phase and quadrature square devices, input with the in-phase and quadrature sums respectively, that outputs squared in-phase and quadrature sums respectively;
- a final adder, input with the squared in-phase and quadrature sums, that generates the overall input power estimation signal.

25. The peak power regulator according to claim 20, wherein the power estimation apparatus comprises:
- a plurality of mixing devices in which each mixing device, input with one pair of in-phase and quadrature baseband input signals, outputs a pair of mixed in-phase and quadrature baseband signals;
- an in-phase adder, input with the mixed in-phase baseband signals, that outputs an in-phase sum;
- a quadrature adder, input with the mixed quadrature baseband signals, that outputs a quadrature sum;
- in-phase and quadrature square devices, input with the in-phase and quadrature sums respectively, that outputs squared in-phase and quadrature sums respectively;
- a final adder, input with the squared in-phase and quadrature sums, that outputs a final sum; and
- a square root device, input with the final sum, that square roots the final sum to generate the overall input power estimation signal.

26. The peak power regulator according to claim 20, wherein the scaling factor is equal to one if the scaling factor generator determines the overall input power estimation signal is less than or equal to the maximum acceptable power signal; and wherein the scaling factor is equal to the maximum acceptable power signal divided by the overall input power estimation signal if the scaling factor generator determines the overall input power estimation signal is greater than the maximum acceptable power signal.

27. The peak power regulator according to claim 20, wherein the excess power correction generator comprises a plurality of pairs of multipliers used to multiply each first delayed in-phase and quadrature baseband signal by a factor equal to one minus the scaling factor to generate the in-phase and quadrature excess power correction signals and the filtering apparatus comprises a plurality of lowpass filters used to filter the in-phase and quadrature excess power correction signals.

28. The peak power regulator according to claim 20, wherein the excess power removal apparatus comprises a plurality of differential adders that subtract the filtered in-phase and quadrature excess power correction signals from the corresponding second delayed in-phase and quadrature baseband signals to generate the in-phase and quadrature baseband output signals.

29. The peak power regulator according to claim 20, wherein the scaling factor generator comprises a first stage apparatus and a second stage apparatus;

wherein the output of the first stage apparatus is equal to one if the first stage apparatus determines the overall input power estimation signal is less than or equal to the maximum acceptable power signal;

wherein the output of the first stage apparatus is equal to the maximum acceptable power signal divided by the overall input power estimation signal if the first stage apparatus determines the overall input power estimation signal is greater than the maximum acceptable power signal; and wherein the output of the second stage apparatus is the scaling factor, the scaling factor being equal to the output from the first stage apparatus divided by a root mean squared (RMS) output from the first stage apparatus over a predetermined period.

30. A Code Division Multiple Access (CDMA) transmitter comprising:

a plurality of data sources coupled in series with a plurality of channel encoder and spreaders, and a plurality of baseband pulse shaping filters;

a peak power regulator according to claim 20 input with the outputs from the baseband pulse shaping filters, the outputs from each baseband pulse shaping filter corresponding to one of the pairs of in-phase and quadrature baseband input signals;

a plurality of quadrature modulators, each input with one of the pairs of in-phase and quadrature baseband output signals; and a combiner, that combines the outputs from the quadrature modulators, coupled in series with an up-converter, a multi-carrier power amplifier, a radio frequency filter, and an antenna.

31. A Code Division Multiple Access (CDMA) transmitter comprising:

a plurality of data sources coupled in series with a plurality of channel encoder and spreaders, and a plurality of baseband pulse shaping filters;

a plurality of peak power regulators according to claim 20 coupled in series, a first peak power regulator input with the outputs from the baseband pulse shaping filters, the outputs from each baseband pulse shaping filter corresponding to one of the pairs of in-phase and quadrature baseband input signals;

a plurality of quadrature modulators, each input with one of the pairs of in-phase and quadrature baseband output signals from a last peak power regulator; and a combiner, that combines the outputs from the quadrature modulators, coupled in series with an up-converter, a multi-carrier power amplifier, a radio frequency filter, and an antenna.

32. An envelope magnitude regulator, input with at least one intermediate frequency (IF) input signal, that outputs at least one IF output signal corresponding to the IF input signal, the envelope magnitude regulator comprising:

first and second delay apparatus that generate first and second delayed IF signals corresponding to the IF input signal;

an envelope magnitude estimation apparatus that generates, with use of the IF input signal, an overall input envelope magnitude estimation signal corresponding to the IF input signal;

a scaling factor generator that generates a scaling factor with use of the overall input envelope magnitude estimation signal and a maximum acceptable envelope magnitude signal;

an excess power correction generator that utilizes the scaling factor and the first delayed IF signal to generate an excess power correction signal;

a filtering apparatus that filters the excess power correction signal to generate a filtered excess power correction signal; and an excess power removal apparatus that utilizes the filtered excess power correction signal and the second delayed IF signal to generate the IF output signal.

33. A Code Division Multiple Access (CDMA) transmitter comprising:

a data source coupled in series with a channel encoder and spreader, a baseband pulse shaping filter, and a quadrature modulators;

an envelope magnitude regulator according to claim 32 input with the output from the quadrature modulator, the output from the quadrature modulator corresponding to the IF input signal; and an up-converter, input with the IF output signal, coupled in series with a power amplifier, a radio frequency filter, and an antenna.

34. A Code Division Multiple Access (CDMA) transmitter comprising:

a plurality of data sources coupled in series with a plurality of channel encoder and spreaders, a plurality of baseband pulse shaping filters, and a plurality of quadrature modulators;

a combiner, that combines the outputs from the quadrature modulators;

an envelope magnitude regulator according to claim 32 input with the output from the combiner, the output from the combiner corresponding to the IF input signal; and an up-converter, input with the IF output signal, coupled in series with a multi-carrier power amplifier, a radio frequency filter, and an antenna.

35. The envelope magnitude regulator according to claim 32, input with a plurality of IF input signals, that outputs a plurality of IF output signals;
- wherein the first and second delay apparatus generate a plurality of first and second delayed IF signals;
- wherein the envelope magnitude estimation apparatus generates the overall input envelope magnitude estimation signal corresponding to the IF input signals with use of the IF input signals;
- wherein the excess power correction generator utilizes the scaling factor and the first delayed IF signals to generate a plurality of excess power correction IF signals;
- wherein the filtering apparatus filters the excess power correction IF signals to generate filtered excess power correction IF signals; and
- wherein the excess power removal apparatus utilizes the filtered excess power correction signals and the second delayed IF signals to generate the IF output signals.

36. The envelope magnitude regulator according to claim 35, wherein the envelope magnitude estimation apparatus comprises:
- an adder, input with the IF input signals, that sums the IF input signals to generate a first sum; and
- an envelope detector, input with the first sum, that generates the overall input envelope magnitude estimation signal.

37. The envelope magnitude regulator according to claim 36, wherein the envelope detector comprises:
- an absolute value device that generates an absolute value IF signal with use of the first sum; and
- a maximum value detector, input with the absolute value IF signal, that determines the maximum input value over a predetermined amount of time, this maximum input value corresponding to the overall input envelope magnitude estimation signal.

38. The envelope magnitude regulator according to claim 36, wherein the envelope detector comprises:
- an up-sampling and interpolation device that generates an interpolated IF signal with use of the first sum;
- an absolute value device that generates an absolute value IF signal with use of the interpolated IF signal; and
- a maximum value detector, input with the absolute value IF signal, that determines the maximum input value over a predetermined amount of time, this maximum input value corresponding to the overall input envelope magnitude estimation signal.

39. The envelope magnitude regulator according to claim 35, wherein the scaling factor is equal to one if the scaling factor generator determines the overall input envelope magnitude estimation signal is less than or equal to the maximum acceptable envelope magnitude signal; and
- wherein the scaling factor is equal to the maximum acceptable envelope magnitude signal divided by the overall input envelope magnitude estimation signal if the scaling factor generator determines the overall input envelope magnitude estimation signal is greater than the maximum acceptable envelope magnitude signal.

40. The envelope magnitude regulator according to claim 35, wherein the excess power correction generator comprises a plurality of multipliers used to multiply each first delayed IF signal by a factor equal to one minus the scaling factor to generate the excess power correction IF signals and the filtering apparatus comprises a plurality of bandpass filters used to filter the excess power correction IF signals.

41. The envelope magnitude regulator according to claim 35, wherein the excess power removal apparatus comprises a differential adder that subtracts the filtered excess power correction IF signals from the second delayed IF signals to generate the output IF signals.

42. The envelope magnitude regulator according to claim 35, wherein the scaling factor generator comprises a first stage apparatus and a second stage apparatus;
- wherein the output of the first stage apparatus is equal to one if the first stage apparatus determines the overall input envelope magnitude estimation signal is less than or equal to the maximum acceptable envelope magnitude signal;
- wherein the output of the first stage apparatus is equal to the maximum acceptable envelope magnitude signal divided by the overall input envelope magnitude estimation signal if the first stage apparatus determines the overall input envelope magnitude estimation signal is greater than the maximum acceptable envelope magnitude signal; and
- wherein the output of the second stage apparatus is the scaling factor, the scaling factor being equal to the output from the first stage apparatus divided by a root mean squared (RMS) output from the first stage apparatus over a predetermined period.

43. A Code Division Multiple Access (CDMA) transmitter comprising:
- a plurality of data sources coupled in series with a plurality of channel encoder and spreaders, a plurality of baseband pulse shaping filters, and a plurality of quadrature modulators;
- an envelope magnitude regulator according to claim 35 input with the outputs from the quadrature modulators, the output from each quadrature modulator corresponding to one of the IF input signals; and
- a combiner, that combines the IF output signals from the envelope magnitude regulator, coupled in series with an up-converter, a multi-carrier power amplifier, a radio frequency filter, and an antenna.

44. A Code Division Multiple Access (CDMA) transmitter comprising:
- a plurality of data sources coupled in series with a plurality of channel encoder and spreaders, a plurality of baseband pulse shaping filters, and a plurality of quadrature modulators;
- a plurality of envelope magnitude regulators according to claim 35 coupled in series, a first envelope magnitude regulator input with the outputs from the quadrature modulators, the output from each quadrature modulator corresponding to one of the IF input signals; and
- a combiner, that combines the IF output signals from a last envelope magnitude regulator, coupled in series with an up-converter, a multi-carrier power amplifier, a radio frequency filter, and an antenna.

45. In a peak power regulator, input with at least one input signal, that outputs at least one output signal corresponding to the input signal, a method for regulating output power comprising the steps of:
- estimating the overall input power level corresponding to the input signal;
- generating a scaling factor with use of the estimate of the overall input power level and a maximum acceptable input power signal;
- delaying the input signal by a first amount;
- generating an excess power correction signal with use of the scaling factor and the input signal delayed by the first amount;

filtering the excess power correction signal;

delaying the input signal by a second amount larger than the first amount; and generating the output signal with use of the input signal delayed by the second amount and the filtered excess power correction signal.

46. A peak power regulator, input with at least one input signal, that outputs at least one output signal corresponding to the input signal, the power regulator comprising:

first and second delay apparatus that generate first and second delayed signals corresponding to the input signal;

a power estimation apparatus that generates, with use of the input signal, an overall input power estimation signal corresponding to the input signal;

a scaling factor generator that generates a scaling factor with use of the overall input power estimation signal and a maximum acceptable power signal;

an excess power correction generator that utilizes the scaling factor and the first delayed signal to generate an excess power correction signal;

an excess power removal apparatus that utilizes the excess power correction signal and the second delayed signal to generates a scaled signal corresponding to the output signal; and a filtering apparatus that filters the scaled signal to generate the output signal.

* * * * *